United States Patent
Kothari et al.

(10) Patent No.: US 7,636,151 B2
(45) Date of Patent: Dec. 22, 2009

(54) SYSTEM AND METHOD FOR PROVIDING RESIDUAL STRESS TEST STRUCTURES

(75) Inventors: Manish Kothari, Cupertino, CA (US);
Lior Kogut, Sunnyvale, CA (US);
Clarence Chui, San Mateo, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 340 days.

(21) Appl. No.: 11/453,633

(22) Filed: Jun. 15, 2006

(65) Prior Publication Data

US 2007/0177129 A1    Aug. 2, 2007

Related U.S. Application Data

(60) Provisional application No. 60/757,048, filed on Jan. 6, 2006.

(51) Int. Cl.
*G01L 1/24* (2006.01)
*G01B 11/02* (2006.01)
*G01B 9/02* (2006.01)

(52) U.S. Cl. ..................... 356/35.5; 356/519
(58) Field of Classification Search ................ 356/480, 356/519, 511, 512, 35.5
See application file for complete search history.

(56) References Cited

U.S. PATENT DOCUMENTS

| | | | |
|---|---|---|---|
| 2,534,846 A | 12/1950 | Ambrose et al. |
| 3,439,973 A | 4/1969 | Paul et al. |
| 3,443,854 A | 5/1969 | Weiss |
| 3,653,741 A | 4/1972 | Marks |
| 3,656,836 A | 4/1972 | de Cremoux et al. |
| 3,813,265 A | 5/1974 | Marks |
| 3,899,295 A | 8/1975 | Halpern et al. |
| 3,955,880 A | 5/1976 | Lierke |
| 4,001,808 A | 1/1977 | Ebihara et al. |
| 4,099,854 A | 7/1978 | Decker et al. |
| 4,224,565 A | 9/1980 | Sosniak et al. |
| 4,228,437 A | 10/1980 | Shelton |
| 4,377,324 A | 3/1983 | Durand et al. |
| 4,389,096 A | 6/1983 | Hori et al. |
| 4,403,248 A | 9/1983 | te Velde |
| 4,441,791 A | 4/1984 | Hornbeck |
| 4,445,050 A | 4/1984 | Marks |

(Continued)

FOREIGN PATENT DOCUMENTS

CH            685887 A5    10/1995

(Continued)

OTHER PUBLICATIONS

U.S. Appl. No. 11/445,926, filed Jun. 1, 2006, Mark W. Miles.

(Continued)

*Primary Examiner*—Patrick J Connolly
(74) *Attorney, Agent, or Firm*—Knobbe Martens Olson & Bear, LLP

(57) ABSTRACT

The invention comprises systems and methods determining residual stress such as that found in interferometric modulators. In one example, a test unit can be configured to indicate residual stress in a film by interferometrically modulating light indicative of an average residual stress in two orthogonal directions of the substrate. The test unit can include a reflective membrane attached to the substrate where membrane is configured as a parallelogram with at least a portion of each side attached to the substrate, and an interferometric cavity formed between a portion of the membrane and a portion of the substrate, and where the membrane is configured to deform based on the residual stress of in the film and modulate light indicative of the amount of membrane deformation.

39 Claims, 22 Drawing Sheets

U.S. PATENT DOCUMENTS

| | | |
|---|---|---|
| 4,459,409 A | 7/1984 | Ladner |
| 4,482,213 A | 11/1984 | Piliavin et al. |
| 4,500,171 A | 2/1985 | Penz et al. |
| 4,519,676 A | 5/1985 | te Velde |
| 4,531,126 A | 7/1985 | Sadones |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,662,746 A | 5/1987 | Hornbeck |
| 4,663,083 A | 5/1987 | Marks |
| 4,681,403 A | 7/1987 | te Velde et al. |
| 4,710,732 A | 12/1987 | Hornbeck |
| 4,748,366 A | 5/1988 | Taylor |
| 4,786,128 A | 11/1988 | Birnbach |
| 4,790,635 A | 12/1988 | Apsley |
| 4,856,863 A | 8/1989 | Sampsell et al. |
| 4,897,360 A | 1/1990 | Guckel et al. |
| 4,954,789 A | 9/1990 | Sampsell |
| 4,956,619 A | 9/1990 | Hornbeck |
| 4,982,184 A | 1/1991 | Kirkwood |
| 5,018,256 A | 5/1991 | Hornbeck |
| 5,022,745 A | 6/1991 | Zayhowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,061,049 A | 10/1991 | Hornbeck |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,142,405 A | 8/1992 | Hornbeck |
| 5,153,771 A | 10/1992 | Link et al. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,175,772 A | 12/1992 | Kahn et al. |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,296,950 A | 3/1994 | Lin et al. |
| 5,305,640 A | 4/1994 | Boysel et al. |
| 5,307,139 A | 4/1994 | Tyson, II et al. |
| 5,311,360 A | 5/1994 | Bloom et al. |
| 5,312,513 A | 5/1994 | Florence et al. |
| 5,323,002 A | 6/1994 | Sampsell et al. |
| 5,325,116 A | 6/1994 | Sampsell |
| 5,327,286 A | 7/1994 | Sampsell et al. |
| 5,331,454 A | 7/1994 | Hornbeck |
| 5,339,116 A | 8/1994 | Urbanus et al. |
| 5,365,283 A | 11/1994 | Doherty et al. |
| 5,381,253 A | 1/1995 | Sharp et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,459,610 A | 10/1995 | Bloom et al. |
| 5,461,411 A | 10/1995 | Florence et al. |
| 5,489,952 A | 2/1996 | Gove et al. |
| 5,497,172 A | 3/1996 | Doherty et al. |
| 5,497,197 A | 3/1996 | Gove et al. |
| 5,499,062 A | 3/1996 | Urbanus |
| 5,500,635 A | 3/1996 | Mott |
| 5,500,761 A | 3/1996 | Goossen et al. |
| 5,506,597 A | 4/1996 | Thompson et al. |
| 5,506,672 A * | 4/1996 | Moslehi ..................... 356/514 |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,559,358 A * | 9/1996 | Burns et al. .................. 257/431 |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,619,059 A | 4/1997 | Li et al. |
| 5,619,365 A | 4/1997 | Rhoads et al. |
| 5,619,366 A | 4/1997 | Rhoads et al. |
| 5,636,052 A | 6/1997 | Arney et al. |
| 5,646,768 A | 7/1997 | Kaeriyama |
| 5,650,881 A | 7/1997 | Hornbeck |
| 5,654,741 A | 8/1997 | Sampsell et al. |
| 5,657,099 A | 8/1997 | Doherty et al. |
| 5,659,374 A | 8/1997 | Gale, Jr. et al. |
| 5,665,997 A | 9/1997 | Weaver et al. |
| 5,703,710 A | 12/1997 | Brinkman et al. |
| 5,710,656 A | 1/1998 | Goossen |
| 5,729,245 A | 3/1998 | Gove et al. |
| 5,739,945 A | 4/1998 | Tayebati |
| 5,745,193 A | 4/1998 | Urbanus et al. |
| 5,745,281 A | 4/1998 | Yi et al. |
| 5,771,116 A | 6/1998 | Miller et al. |
| 5,784,190 A | 7/1998 | Worley |
| 5,784,212 A | 7/1998 | Hornbeck |
| 5,818,095 A | 10/1998 | Sampsell |
| 5,825,528 A | 10/1998 | Goossen |
| 5,835,255 A | 11/1998 | Miles |
| 5,842,088 A | 11/1998 | Thompson |
| 5,912,758 A | 6/1999 | Knipe et al. |
| 5,986,796 A | 11/1999 | Miles |
| 6,028,690 A | 2/2000 | Carter et al. |
| 6,038,056 A | 3/2000 | Florence et al. |
| 6,040,937 A | 3/2000 | Miles |

| | | | |
|---|---|---|---|
| 6,049,317 A | 4/2000 | Thompson et al. | |
| 6,055,090 A | 4/2000 | Miles | |
| 6,061,075 A | 5/2000 | Nelson et al. | |
| 6,077,452 A | 6/2000 | Litvak | |
| 6,088,474 A | 7/2000 | Dudasko et al. | |
| 6,099,132 A | 8/2000 | Kaeriyama | |
| 6,113,239 A | 9/2000 | Sampsell et al. | |
| 6,147,790 A | 11/2000 | Meier et al. | |
| 6,160,833 A | 12/2000 | Floyd et al. | |
| 6,180,428 B1 | 1/2001 | Peeters et al. | |
| 6,201,633 B1 | 3/2001 | Peeters et al. | |
| 6,232,936 B1 | 5/2001 | Gove et al. | |
| 6,282,010 B1 | 8/2001 | Sulzbach et al. | |
| 6,285,207 B1 | 9/2001 | Listwan | |
| 6,285,449 B1 * | 9/2001 | Ellingson et al. .......... 356/237.1 | |
| 6,295,154 B1 | 9/2001 | Laor et al. | |
| 6,323,982 B1 | 11/2001 | Hornbeck | |
| 6,347,009 B1 | 2/2002 | Takeuchi | |
| 6,407,560 B1 | 6/2002 | Walraven et al. | |
| RE37,847 E | 9/2002 | Henley et al. | |
| 6,447,126 B1 | 9/2002 | Hornbeck | |
| 6,465,355 B1 | 10/2002 | Horsley | |
| 6,466,358 B2 | 10/2002 | Tew | |
| 6,473,274 B1 | 10/2002 | Maimone et al. | |
| 6,480,177 B2 | 11/2002 | Doherty et al. | |
| 6,496,122 B2 | 12/2002 | Sampsell | |
| 6,545,335 B1 | 4/2003 | Chua et al. | |
| 6,548,908 B2 | 4/2003 | Chua et al. | |
| 6,549,338 B1 | 4/2003 | Wolverton et al. | |
| 6,552,840 B2 | 4/2003 | Knipe | |
| 6,567,715 B1 | 5/2003 | Sinclair et al. | |
| 6,574,033 B1 | 6/2003 | Chui et al. | |
| 6,589,625 B1 | 7/2003 | Kothari et al. | |
| 6,600,201 B2 | 7/2003 | Hartwell et al. | |
| 6,606,175 B1 | 8/2003 | Sampsell et al. | |
| 6,625,047 B2 | 9/2003 | Coleman, Jr. | |
| 6,630,786 B2 | 10/2003 | Cummings et al. | |
| 6,632,698 B2 | 10/2003 | Ives | |
| 6,643,069 B2 | 11/2003 | Dewald | |
| 6,650,455 B2 | 11/2003 | Miles | |
| 6,657,218 B2 | 12/2003 | Noda | |
| 6,666,561 B1 | 12/2003 | Blakley | |
| 6,674,090 B1 | 1/2004 | Chua et al. | |
| 6,674,562 B1 | 1/2004 | Miles | |
| 6,680,792 B2 | 1/2004 | Miles | |
| 6,710,908 B2 | 3/2004 | Miles et al. | |
| 6,741,377 B2 | 5/2004 | Miles | |
| 6,741,384 B1 | 5/2004 | Martin et al. | |
| 6,741,503 B1 | 5/2004 | Farris et al. | |
| 6,747,785 B2 | 6/2004 | Chen et al. | |
| 6,747,800 B1 | 6/2004 | Lin | |
| 6,750,152 B1 | 6/2004 | Christenson et al. | |
| 6,753,528 B1 | 6/2004 | Nikoonahad et al. | |
| 6,775,174 B2 | 8/2004 | Huffman et al. | |
| 6,778,155 B2 | 8/2004 | Doherty et al. | |
| 6,781,702 B2 * | 8/2004 | Giannakopoulos et al. .. 356/601 | |
| 6,794,119 B2 | 9/2004 | Miles | |
| 6,811,267 B1 | 11/2004 | Allen et al. | |
| 6,819,469 B1 | 11/2004 | Koba | |
| 6,822,628 B2 | 11/2004 | Dunphy et al. | |
| 6,824,739 B1 | 11/2004 | Arney et al. | |
| 6,829,132 B2 | 12/2004 | Martin et al. | |
| 6,853,129 B1 | 2/2005 | Cummings et al. | |
| 6,855,610 B2 | 2/2005 | Tung et al. | |
| 6,859,218 B1 | 2/2005 | Luman et al. | |
| 6,861,277 B1 | 3/2005 | Monroe et al. | |
| 6,862,022 B2 | 3/2005 | Slupe | |
| 6,862,029 B1 | 3/2005 | D'Souza et al. | |
| 6,867,896 B2 | 3/2005 | Miles | |
| 6,870,581 B2 | 3/2005 | Li et al. | |
| 6,870,654 B2 | 3/2005 | Lin et al. | |
| 6,882,458 B2 | 4/2005 | Lin et al. | |
| 6,882,461 B1 | 4/2005 | Tsai et al. | |
| 6,912,022 B2 | 6/2005 | Lin et al. | |
| 6,952,303 B2 | 10/2005 | Lin et al. | |
| 6,958,847 B2 | 10/2005 | Lin | |
| 7,123,216 B1 | 10/2006 | Miles | |
| 7,259,865 B2 * | 8/2007 | Cummings et al. .......... 356/503 |
| 7,423,287 B1 * | 9/2008 | U'Ren et al. ................... 257/48 |
| 2001/0003487 A1 | 6/2001 | Miles | |
| 2002/0015215 A1 | 2/2002 | Miles | |
| 2002/0054424 A1 | 5/2002 | Miles | |
| 2002/0075555 A1 | 6/2002 | Miles | |
| 2002/0126364 A1 | 9/2002 | Miles | |
| 2002/0157033 A1 | 10/2002 | Cox | |
| 2003/0016361 A1 | 1/2003 | Mank et al. | |
| 2003/0043157 A1 * | 3/2003 | Miles ......................... 345/540 |
| 2003/0063081 A1 | 4/2003 | Kimura et al. | |
| 2003/0072070 A1 | 4/2003 | Miles | |
| 2003/0077881 A1 | 4/2003 | Gelmi et al. | |
| 2003/0112231 A1 | 6/2003 | Kurumisawa | |
| 2003/0202264 A1 | 10/2003 | Weber et al. | |
| 2003/0202265 A1 | 10/2003 | Reboa et al. | |
| 2003/0202266 A1 | 10/2003 | Ring et al. | |
| 2004/0004610 A1 | 1/2004 | Iwami et al. | |
| 2004/0027636 A1 | 2/2004 | Miles | |
| 2004/0051929 A1 | 3/2004 | Sampsell et al. | |
| 2004/0057043 A1 | 3/2004 | Newman et al. | |
| 2004/0058532 A1 | 3/2004 | Miles et al. | |
| 2004/0070400 A1 | 4/2004 | van Spengen | |
| 2004/0075825 A1 * | 4/2004 | Suresh et al. ................. 356/32 |
| 2004/0080807 A1 | 4/2004 | Chen et al. | |
| 2004/0125281 A1 | 7/2004 | Lin et al. | |
| 2004/0145049 A1 | 7/2004 | McKinnell et al. | |
| 2004/0145811 A1 | 7/2004 | Lin et al. | |
| 2004/0147056 A1 | 7/2004 | McKinnell et al. | |
| 2004/0147198 A1 | 7/2004 | Lin et al. | |
| 2004/0160143 A1 | 8/2004 | Shreeve et al. | |
| 2004/0174583 A1 | 9/2004 | Chen et al. | |
| 2004/0175577 A1 | 9/2004 | Lin et al. | |
| 2004/0179281 A1 | 9/2004 | Reboa | |
| 2004/0206953 A1 | 10/2004 | Morena et al. | |
| 2004/0207897 A1 | 10/2004 | Lin | |
| 2004/0209192 A1 | 10/2004 | Lin et al. | |
| 2004/0209195 A1 | 10/2004 | Lin | |
| 2004/0212026 A1 | 10/2004 | Van Brocklin et al. | |
| 2004/0217378 A1 | 11/2004 | Martin et al. | |
| 2004/0217919 A1 | 11/2004 | Pichl et al. | |
| 2004/0218251 A1 | 11/2004 | Piehl et al. | |
| 2004/0218334 A1 | 11/2004 | Martin et al. | |
| 2004/0218341 A1 | 11/2004 | Martin et al. | |
| 2004/0227493 A1 | 11/2004 | Van Brocklin et al. | |
| 2004/0240032 A1 | 12/2004 | Miles | |
| 2004/0240138 A1 | 12/2004 | Martin et al. | |
| 2004/0245588 A1 | 12/2004 | Nikkel et al. | |
| 2004/0262604 A1 | 12/2004 | Lee | |
| 2004/0263944 A1 | 12/2004 | Miles et al. | |
| 2005/0001828 A1 | 1/2005 | Martin et al. | |
| 2005/0003667 A1 | 1/2005 | Lin et al. | |
| 2005/0024557 A1 | 2/2005 | Lin | |
| 2005/0030551 A1 * | 2/2005 | Rosakis et al. .............. 356/521 |
| 2005/0035699 A1 | 2/2005 | Tsai | |
| 2005/0036095 A1 | 2/2005 | Yeh et al. | |
| 2005/0036192 A1 | 2/2005 | Lin et al. | |
| 2005/0038950 A1 | 2/2005 | Adelmann | |
| 2005/0042117 A1 | 2/2005 | Lin | |
| 2005/0042777 A1 | 2/2005 | Boger et al. | |
| 2005/0046922 A1 | 3/2005 | Lin et al. | |
| 2005/0046948 A1 | 3/2005 | Lin | |
| 2005/0057442 A1 | 3/2005 | Way | |
| 2005/0068583 A1 | 3/2005 | Gutkowski et al. | |
| 2005/0068605 A1 | 3/2005 | Tsai | |
| 2005/0068606 A1 | 3/2005 | Tsai | |
| 2005/0069209 A1 | 3/2005 | Damera-Venkata et al. | |
| 2005/0078348 A1 | 4/2005 | Lin | |
| 2005/0168849 A1 | 8/2005 | Lin | |

| | | | |
|---|---|---|---|
| 2005/0195462 | A1 | 9/2005 | Lin |
| 2005/0202649 | A1 | 9/2005 | Hung et al. |
| 2005/0249966 | A1 | 11/2005 | Tung et al. |
| 2006/0066864 | A1 | 3/2006 | Cummings et al. |
| 2006/0066871 | A1 | 3/2006 | Cummings et al. |
| 2006/0066872 | A1 | 3/2006 | Cummings et al. |
| 2006/0066935 | A1 | 3/2006 | Cummings et al. |
| 2006/0077381 | A1 | 4/2006 | Cummings et al. |
| 2006/0077519 | A1* | 4/2006 | Floyd .................. 359/290 |
| 2006/0077527 | A1* | 4/2006 | Cummings ............ 359/291 |
| 2006/0176487 | A1 | 8/2006 | Cummings et al. |
| 2007/0040777 | A1* | 2/2007 | Cummings .............. 345/84 |
| 2007/0096300 | A1* | 5/2007 | Wang et al. ............ 257/709 |
| 2007/0177129 | A1* | 8/2007 | Kothari et al. ........... 356/32 |
| 2007/0273865 | A1* | 11/2007 | Niitsu et al. ............. 356/33 |
| 2008/0002206 | A1 | 1/2008 | Cummings et al. |
| 2008/0003352 | A1 | 1/2008 | Cummings et al. |
| 2008/0110855 | A1* | 5/2008 | Cummings ............. 216/24 |
| 2008/0112035 | A1* | 5/2008 | Cummings ............ 359/290 |
| 2008/0112036 | A1* | 5/2008 | Cummings ............ 359/290 |
| 2008/0234970 | A1* | 9/2008 | U'Ren et al. ........... 702/138 |
| 2008/0278787 | A1* | 11/2008 | Sasagawa ............. 359/224 |
| 2008/0278788 | A1* | 11/2008 | Sasagawa ............. 359/224 |

FOREIGN PATENT DOCUMENTS

| | | |
|---|---|---|
| DE | 19525081 | 1/1997 |
| EP | 1065645 | 1/2001 |
| FR | 2516785 | 5/1983 |
| GB | 2030721 | 4/1980 |
| GB | 2 217 839 | 11/1989 |
| JP | 01259243 | 1/1990 |
| JP | 3002540 A | 1/1991 |
| JP | 11 337412 | 3/2000 |
| WO | WO 95/030924 | 11/1995 |
| WO | WO 97/017628 | 5/1997 |
| WO | WO 99/52006 A2 | 10/1999 |
| WO | WO 99/52006 A3 | 10/1999 |
| WO | WO 01/69310 A1 | 9/2001 |
| WO | WO 02/093116 A1 | 11/2002 |
| WO | WO 03/007049 A1 | 1/2003 |
| WO | WO 03/069413 A1 | 8/2003 |
| WO | WO 03/073151 A1 | 9/2003 |
| WO | WO 2004/006003 A1 | 1/2004 |
| WO | WO 2004/025239 A2 | 3/2004 |
| WO | WO 2004/026757 A2 | 4/2004 |
| WO | WO 2005/001410 A1 | 1/2005 |

OTHER PUBLICATIONS

ISR and WO for PCT/US06/049148 filed Dec. 22, 2006.
Akasaka, "Three-Dimensional IC Trends," Proceedings of IEEE, vol. 74, No. 12, pp. 1703-1714 (Dec. 1986).
Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).
Aratani et al., "Surface Micromachined Tuneable Interferometer Array," Sensors and Actuators, pp. 17-23 (1994).
Conner, "Hybrid Color Display Using Optical Interference Filter Array," SID Digest, pp. 577-580 (1993).
Dokmeci, et al. *A High-Sensitivity Polyimide Capacitive Relative Humidity Sensor for Monitoring Anodically Bonded Hermetic Micropackages* Journal of Microelectromechanical Systems, vol. 10, No. 2, Jun. 2001, 197-204.
Durr et al., "Reliability Test and Failure Analysis of Optical MEMS", Proceedings of the 9th International Symposium on the Physical and Failure Analysis of Integrated Circuits, pp. 201-206, (Jul. 8-12, 2002).
Drieenhuizen, et al., "Comparison of Techniques for measuring Both Compressive and Tensile Stress in Thin Films." *Sensors and Actuators*, vol. 37-38, pp. 759-765. (1993).

Goossen et al., "Possible Display Applications of the Silicon Mechanical Anti-Reflection Switch," Society for Information Display (1994).
Goossen et al., "Silicon Modulator Based on Mechanically-Active Anti-Reflection Layer with 1Mbit/sec Capability for Fiber-in-the-Loop Applications," IEEE Photonics Technology Letters (Sep. 1994).
Gosch, "West Germany Grabs the Lead in X-Ray Lithography," Electronics, pp. 78-80 (Feb. 5, 1987).
Guckel et al., "Fine-Grained Polysilicon Films with Built-In Tensile Strain," *IEEE Transactions on Electron Devices*, vol. 35, No. 6, pp. 801-802, (1988).
Harpster Timothy J et al., "A Passive Humidity Monitoring System for In Situ Remote Wireless Testing of Micropackages," J Microelectromech Syst. vol. 11, No. 1, p. 61-67, (2002).
"High-reflectivity Specular Reflectance standard," [Online] XP002374849, (URL:http://web.archive.org/web/20040220134330/www.oceanoptics.com/products/stan.ss1.asp> (retrieved on Feb. 20, 2004).
Howard et al., "Nanometer-Scale Fabrication Techniques," VLSI Electronics: Microstructure Science, vol. 5, pp. 145-153 and pp. 166-173 (1982).
Jerman et al., "A Miniature Fabry-Perot Interferometer with a Corrugated Silicon Diaphragm Support," IEEE Electron Devices Society (1988).
Jin, et al. "*MEMS Vacuum Packaging Technology and Applications*" Electronics Packaging Technology, 2003, 5$^{th}$ Conference, Dec. 10-12, 2003, Piscataway, NJ, pp. 301-306.
Johnson "Optical Scanners," Microwave Scanning Antennas, vol. 1, pp. 251-261 (1964).
Light over Matter, Circle No. 36 (Jun. 1993).
Lin et al., "A Micro Strain Gauge with Mechanical Amplifier," *J. of Microelectromechanical Systems*, vol. 6, No. 4, (1997).
"Low-reflectivity Specular Reflectance Standard," Internet Article, XP002374848 <URL:http://web.archive.org/web/20040220134257/www.oceanoptics.com/Productsstan.ss1.asp> (retrieved on Feb. 20, 2004).
Miles, "A New Reflective FPD Technology Using Interferometric Modulation," Society for Information Display '97 Digest, Session 7.3.
Miles, "Interferometric Modulation:MOEMS as an Enabling Technology for High-Perfomorance Reflective Displays," Proceedings of the SPIE, vol. 4985, p. 131-139. (2003).
Miles et al., "Digital Paper™ for Reflective Displays," J. of the Society for Information Display Soc. Inf. Display USA. vol. 11, No. 1, p. 209-215. (2003).
Newsbreaks, "Quantum-trench devices might operate at terahertz frequencies," Laser Focus World (May 1993).
Oliner et al., "Radiating Elements and Mutual Coupling," Microwave Scanning Antennas, vol. 2, p. 131-194 (1966).
Pruessner et al., "Mechanical Property Measurement of InP-based MEMS for optical communications," *Sensors and Actuators*, vol. 105, pp. 190-200, (2003).
Raley et al., "A Fabry-Perot Microinterferometer for Visible Wavelengths," IEEE Solid-State Sensor and Actuator Workshop, Hilton Head, SC (1992).
"Reflection/backscattering Probes," Ocean Optics, Inc, Internet Article, p. 1-3. XP-002358482. URL:http://web.archive.org/web/20040619022333/www.oceanoptics.com/products/reflectionprobes.asp> retreived on Jun. 19, 2004.
Roveti, "Choosing a Humidity Sensor: A Review of Three Technologies", http://www.sensorsmag.com/articles/0701/54/main.shtml, (published prior to Sep. 17, 2004).
"S2000 Miniature Fiber Optic Spectrometer", Internet Article, XP002358483, pp. 1-2, <URL:http://web.archive.org/web/20040617035842/www.oceanoptics.com/products/s2000.asp> (Retrieved Jun. 17, 2004).
Singh et al., "Strain Studies in LPCVD Polysilicon for Surface Micromachined Devices," *Sensors and Actuators*, vol. 77, pp. 133-138, (1999).
Skaggs et al, "Automatic Testing of the Digital Micromirror Device", IEEE/LEOS 1996 Summer Topical Meetings, pp. 11-12, (Aug. 5-9, 1996).

Sperger et al., "High Performance Patterned All-Dielectric Interference Colour Filter for Display Applications," SID Digest, pp. 81-83 (1994).

Srikar et al., "A Critical Review of Microscale Mechanical Testing Methods Used in the Design of Microelectromechanical Systems," *Society for Experimental mechanics*, vol. 43, No. 3, (2003).

Stone, "Radiation and Optics, An Introduction to the Classical Theory," McGraw-Hill, pp. 340-343 (1963).

Tabata et al., "In Situ Observation and Analysis of Wet Etching Process for Micro Electro-mechanical systems," Proc. Of the Workshop on Micro Electro Mechanical Systems. vol. Workshop 4. p. 99-102, (1991).

Tominette, et al, Moisture and Impurities Detection and removal in Packaged MEMS, proceeding of SPIE vol. 4558, (2001), pp. 215-225.

Walker, et al., "Electron-beam-tunable Interference Filter Spatial Light Modulator," Optics Letters vol. 13, No. 5, pp. 345-347 (May 1988).

Waelti M. et al., "Package Quality Testing Using Integrated Pressure Sensor," Proc. Of the SPIE, vol. 3582, p. 981-986, (1998).

Winton, John M., "A novel way to capture solar energy," Chemical Week, pp. 17-18 (May 15, 1985).

Wu, "Design of a Reflective Color LCD Using Optical Interference Reflectors," ASIA Display '95, pp. 929-931 (Oct. 16, 1995).

Zhang, et al., "Measurements of Residual Stresses in Thin Films Using Micro-Rotating-Structures." *Thin Solid Films*, vol. 335, pp. 97-105, (1998).

Jackson, "Classical Electrodynamics," John Wiley & Sons Inc., pp. 568-573 (1962).

Osterberg et al., 1997, M-test: a test chip for MEMS material property measurement using electrostatically actuated test structures, Journal of Microelectricalmechanical Systems, 6(2):107-118.

* cited by examiner

|  | Column Output Signals | |
|---|---|---|
|  | $+V_{bias}$ | $-V_{bias}$ |
| Row Output Signals  0 | Stable | Stable |
| $+\Delta V$ | Relax | Actuate |
| $-\Delta V$ | Actuate | Relax |

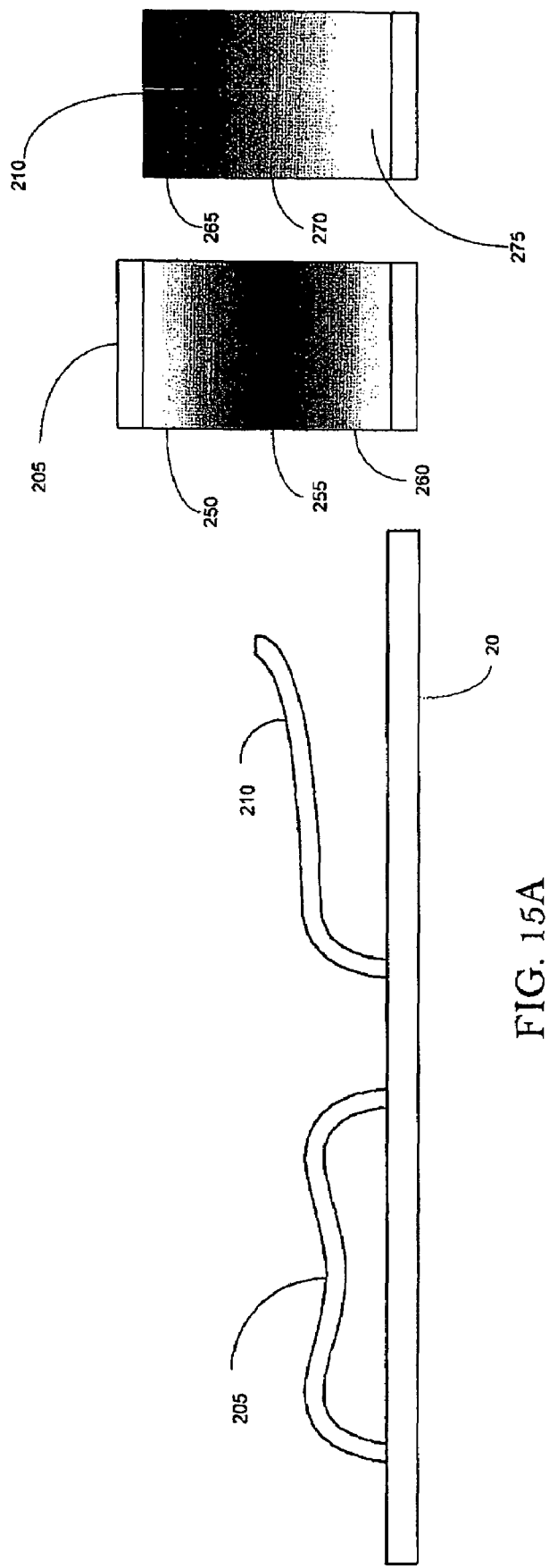

SYSTEM AND METHOD FOR PROVIDING RESIDUAL STRESS TEST STRUCTURES

CROSS REFERENCE TO RELATED APPLICATIONS

This application claims priority to U.S. Provisional Application No. 60/757,048, titled "System and Method for Providing Residual Stress Test Structures," filed Jan. 6, 2006, which is incorporated by reference in its entirety.

BACKGROUND

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. An interferometric modulator may comprise a pair of conductive plates, one or both of which may be transparent and/or reflective in whole or part and capable of relative motion upon application of an appropriate electrical signal. One plate may comprise a stationary layer deposited on a substrate, the other plate may comprise a metallic membrane separated from the stationary layer by an air gap. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

In one embodiment, a test unit is configured to indicate residual stress in a deposited film, wherein the test unit is configured to interferometrically modulate light indicative of average residual stress in two orthogonal directions of the film. In one aspect of some embodiments, the test unit includes a reflective deformable membrane attached to the substrate, the membrane configured as a parallelogram with at least a portion of each side attached to the substrate, and where the membrane includes a portion of the deposited film, and an interferometric cavity formed between a portion of the membrane and a portion of the substrate, wherein the membrane is configured to deform based on the residual stress of the film and modulate light indicative of the amount of membrane deformation. The membrane can comprise silicon, aluminum, nickel, germanium, gold, chromium, silver, or alloys thereof. In some embodiments, where the membrane is configured such that light modulated by the membrane includes color information that indicates the residual stress of the films.

In another embodiment, a system is configured to determine residual stress of a deposited film, the system including one or more test units, each test unit comprising a reflective membrane that comprises a portion of the deposited film, wherein the membrane is configured as a parallelogram with at least a portion of each side attached to a substrate, wherein the membrane is configured to deform based on the residual stress of the film and modulate light indicative of the amount of membrane deformation, an imaging system positionable to receive modulated light reflecting from the one or more test units and configured to produce image data associated with the received light, and a computer in communication with the imaging system, the computer configured to process the image data and generate information relating to the residual stress of the film.

In another embodiment, a method of measuring residual stress in a deposited film includes interferometrically modulating light using a membrane that deforms based on residual stress of the film such that the modulated light indicates the residual stress of the film in two orthogonal directions. The method can further includes determining the residual stress in the film based on the modulated light.

In another embodiment, a test unit for measuring residual stress of a deposited film includes means for reflecting a first portion of light, and means for reflecting a second portion of light that interferes with the first portion of light forming modulated light that indicates the residual stress in two orthogonal directions of the film. The test unit can further include means for determining the residual stress in the film based on the modulated light. In some embodiments the determining means can include means for receiving the modulated light, means for generating image data from the received modulated light, and means for determining residual stress information based on the image data.

In another embodiment, a method of manufacturing a device to indicate the residual stress in a deposited film includes disposing a thin reflective membrane on a substrate such that an interferometric cavity is formed between a portion of the membrane and a portion of the substrate, where the membrane comprises a portion of the deposited film, where the membrane is configured in the shape of a parallelogram with at least a portion of each side attached to the substrate, and the membrane is further configured to deform based on the residual stress of the film in two orthogonal directions and modulate light indicative of the amount of deformation.

In another embodiment, a system for measuring residual stress in a deposited film includes a test unit including a reflective membrane attached to the substrate, the test unit configured to modulate light using an interferometric cavity formed between the membrane and the substrate and where the membrane comprises a portion of the deposited film, an electrode disposed such that at least a portion of the interferometric cavity is between the electrode and the membrane, and a power source configured to apply a voltage between the membrane and the electrode, where the test unit is configured such that the membrane moves at a frequency in response to the applied voltage, and where the modulated light is indicative of when the beam is moving at a resonant frequency, the resonant frequency being based on the residual stress in the deposited film. In some embodiments, the system can include an imaging system positionable to receive modulated light from the test unit and produce image data associated with the received light, and a computer in communication with the imaging system, the computer configured to receive the image data from the imaging system, determine the resonant frequency of the membrane, and generate residual stress information relating to the film based on the resonant frequency.

In another embodiment, a method of measuring residual stress in a deposited film includes moving a membrane attached to the substrate at a resonant frequency wherein the membrane comprises a portion of the deposited film, modulating light interferometrically based on the movement of the membrane, detecting the modulated light, and determining the residual stress of the deposited film based on the detected modulated light. In some embodiments, the membrane includes applying a voltage across the membrane and an electrode disposed near the membrane such that the application of the voltage causes the membrane to move at a resonant frequency. In some embodiments, the method includes using information in the modulated light to determine the resonant frequency of the membrane.

In another embodiment, a system for measuring residual stress in a deposited film, includes means for moving a membrane attached to the substrate at a resonant frequency, means for modulating light interferometrically based on the movement of the membrane, means for detecting the modulated light, means for determining the residual stress of the film based on the detected modulated light.

In another embodiment, a method of manufacturing a test unit to indicate the residual stress in a film includes disposing a reflective membrane on a substrate such that an interferometric cavity is formed between a portion of the membrane and a portion of the substrate, where the membrane is connected to the substrate on two opposite and parallel sides, where the membrane comprises a portion of the film, and wherein the membrane configured to deform based on the residual stress of the film and modulate light indicative of the amount of deformation, and disposing an electrode such that the interferometric cavity is between the membrane and the electrode, and connecting a voltage source to the membrane and the electrode, the voltage source configured to provide voltage across the membrane and electrode such that the membrane moves at a resonant frequency.

In another embodiment, a display device includes a substrate, one or more one bi-stable display elements disposed on the substrate wherein each the one or more bi-stable display elements comprise a moveable membrane which comprises a portion of a film, and one or more test units, each test unit comprising a membrane defining a portion of an interferometric cavity, where the membrane comprises a portion of the film, and where the one or more test units are configured to modulate light such that the modulated light is indicative of the residual stress of the film.

In another embodiment, a method of determining residual stress in a film layer incorporated in a display includes interferometrically modulating light, wherein the modulated light is indicative of the residual stress in the film layer, detecting the modulated light, generating image data associated with the detected modulated light, and determining residual stress in the film layer of the display based on the image data.

In another embodiment, a system for determining residual stress in film incorporated in a display includes means for interferometrically modulating light at one or more test units disposed near a display, where the modulated light is indicative of the residual stress in the film, means for detecting the modulated light, means for generating image data associated with the detected modulated light, and means for determining residual stress in the film based on the image data. In some embodiments, the system includes a test unit that includes a reflective membrane attached to the substrate, the test unit configured to modulate light using an interferometric cavity formed between the membrane and the substrate wherein the membrane comprises a portion of the film, an electrode disposed such that at least a portion of the interferometric cavity is between the electrode and the membrane, and a power source configured to apply a voltage between the membrane and the electrode, where the test unit is configured such that the membrane moves at a frequency in response to the applied voltage, and wherein the modulated light is indicative of when the beam is moving at a resonant frequency, the resonant frequency being based on the residual stress of the film.

BRIEF DESCRIPTION OF THE DRAWINGS

FIG. 15A is a side plan view illustrating two embodiments of tests units in a third state of stress.

FIG. 15B is a schematic representing a top plan from the side of the substrate illustrating a pattern of modulated light from the exemplary test units illustrated in FIG. 15A.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

One embodiment of the invention comprises an interferometric test unit that is used to determine material residual stresses in displays comprising interferometric modulators. The presence of residual stresses in an interferometric modulator can affect its performance and reliability. Variations in the distance along the length of the interferometric cavity of the modulator can result in unacceptable variations in color. On the other hand, this property is a useful tool in determining the residual stress of the structure itself, because the variations in the color can be used to determine the variations and degree of deformation in the membrane. As described hereinbelow, to facilitate interferometric modulator performance and process control during fabrication, residual stress can be measured on the panel/wafer level, and variations of residual stress monitored across the wafer, from wafer to wafer, and from lot to lot, using interferometric test units that are configured to reflect light indicative of the residual stress of the surface on which they are attached.

Figure 1:
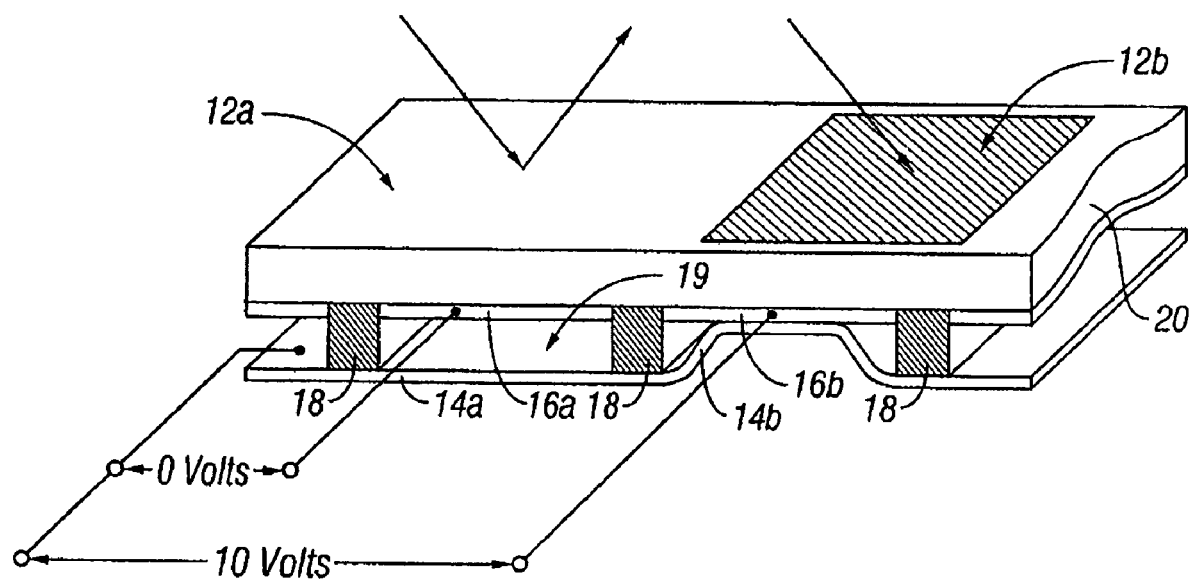
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
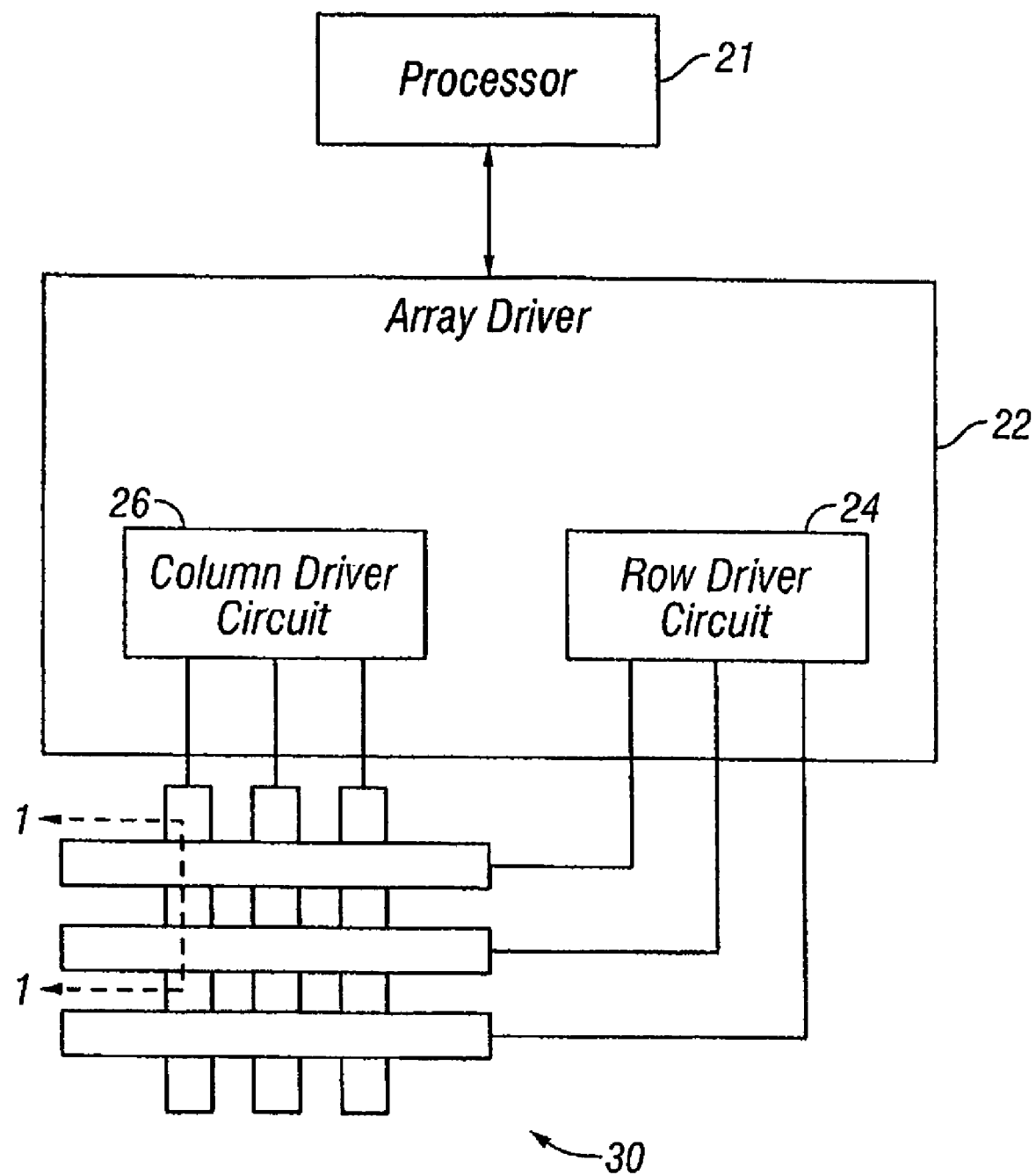
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
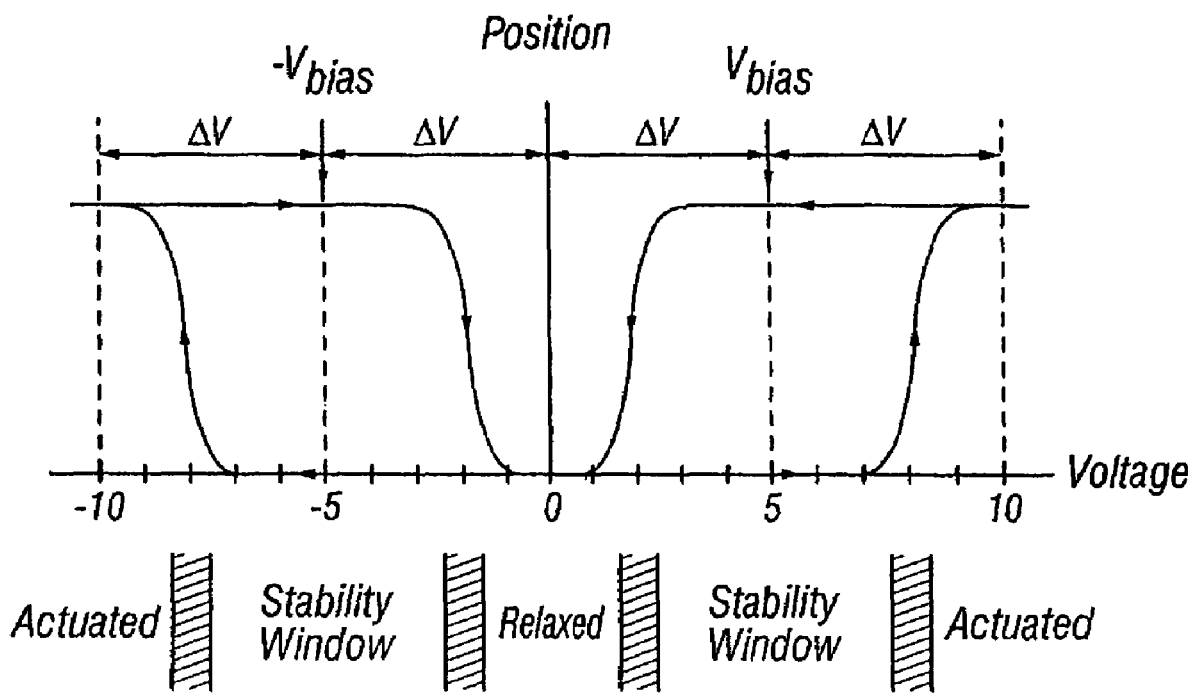
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
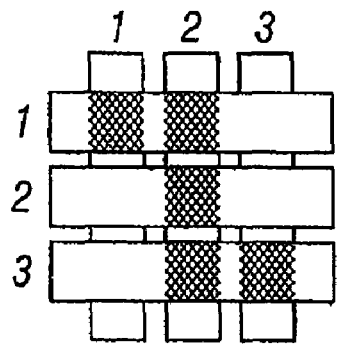
FIGS. 5A and 5B illustrate one exemplary timing diagram for row and column signals that may be used to write a frame of display data to the 3×3 interferometric modulator display of FIG. 2.
Figure 5B:
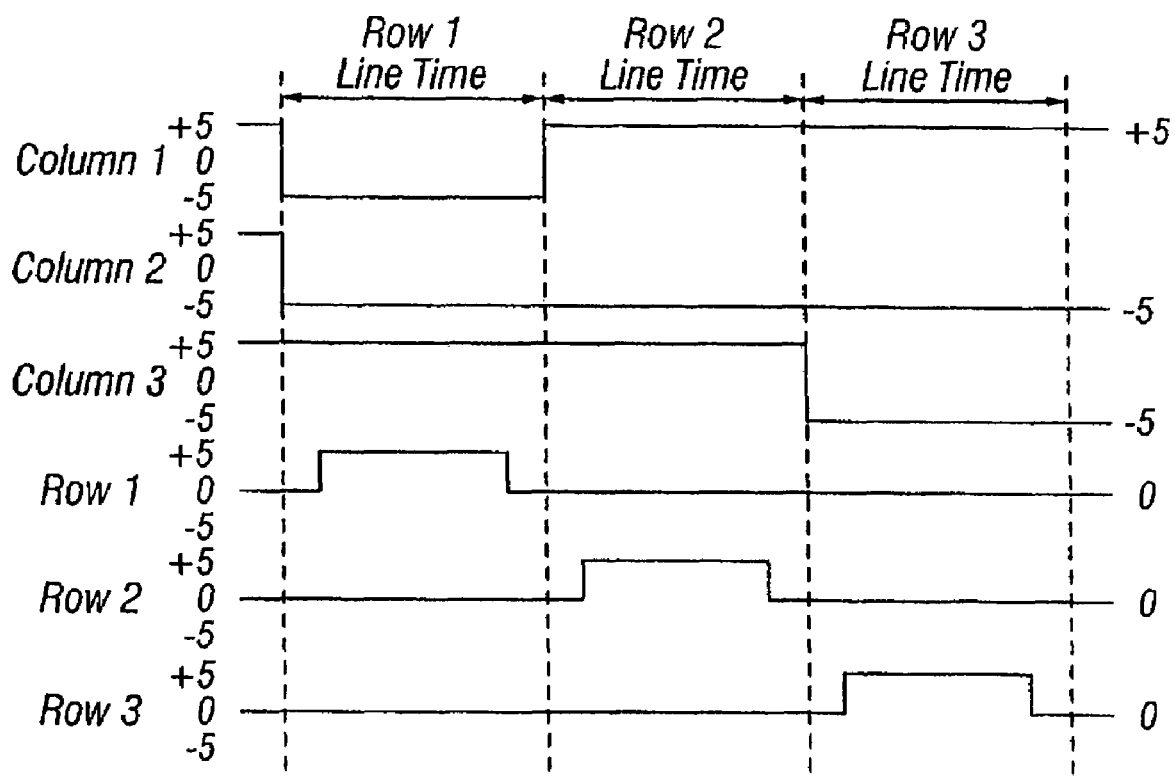

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
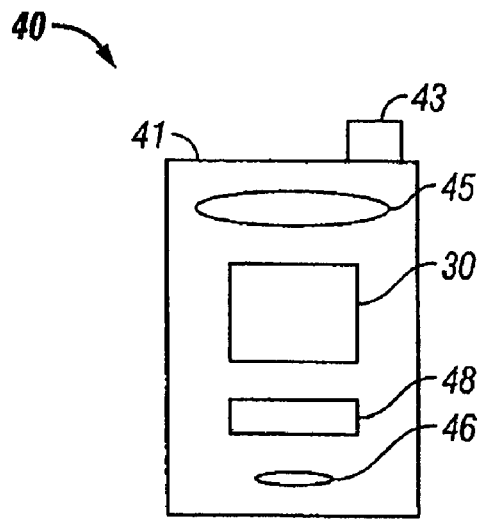
FIGS. 6A and 6B are system block diagrams illustrating an embodiment of a visual display device comprising a plurality of interferometric modulators.
Figure 6B:
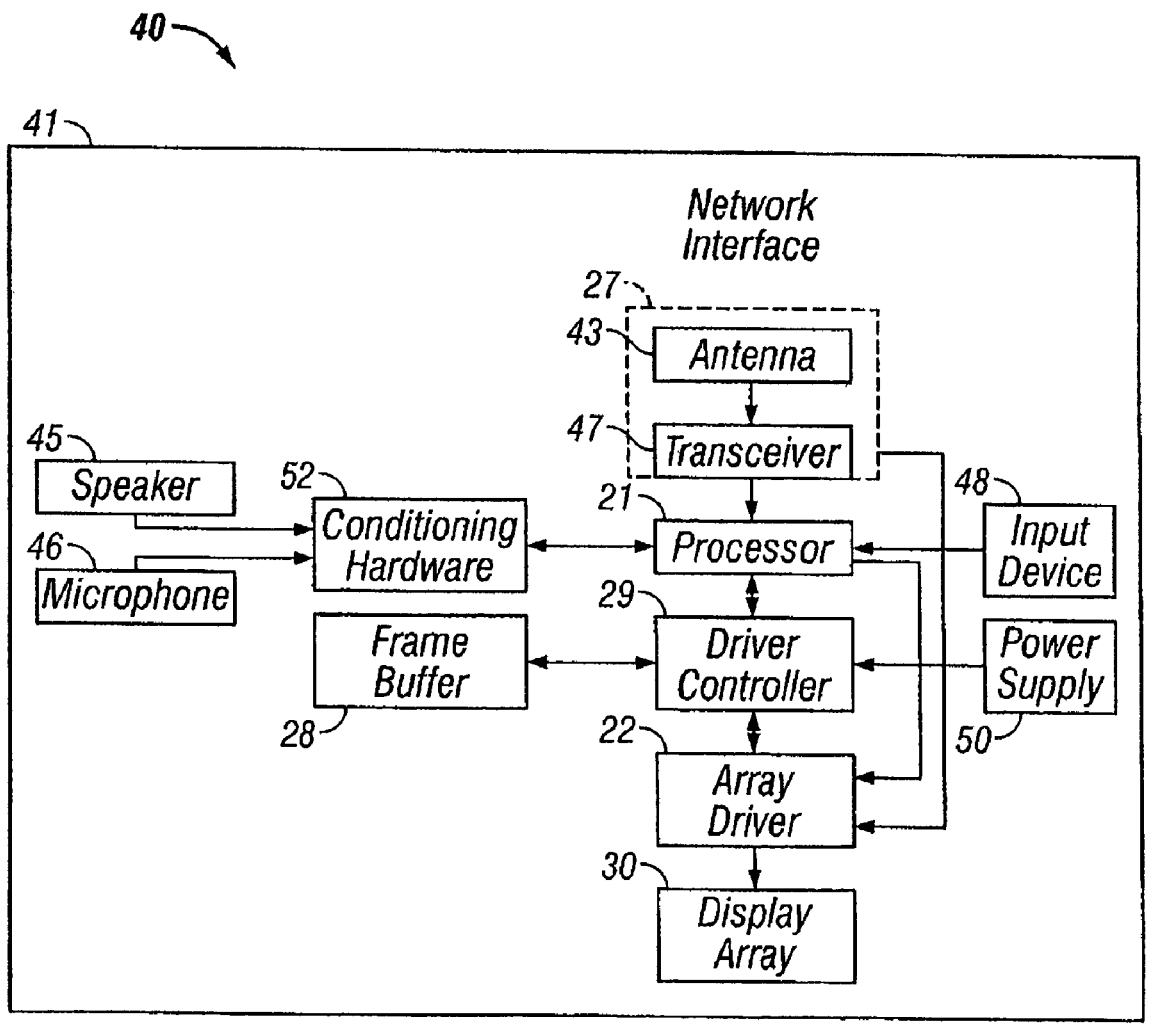

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
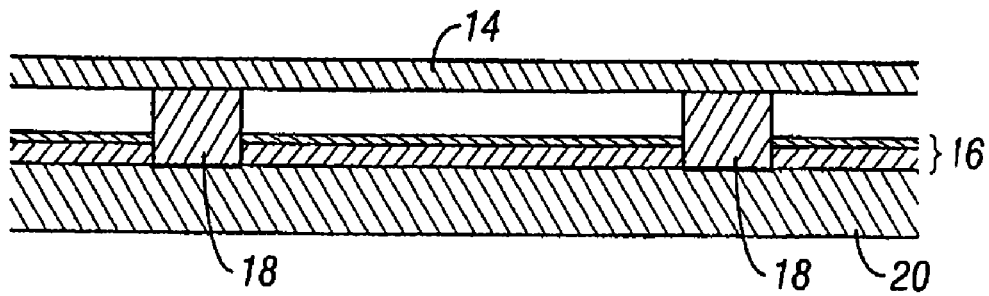
FIG. 7A is a cross section of the device of FIG. 1.
Figure 7B:
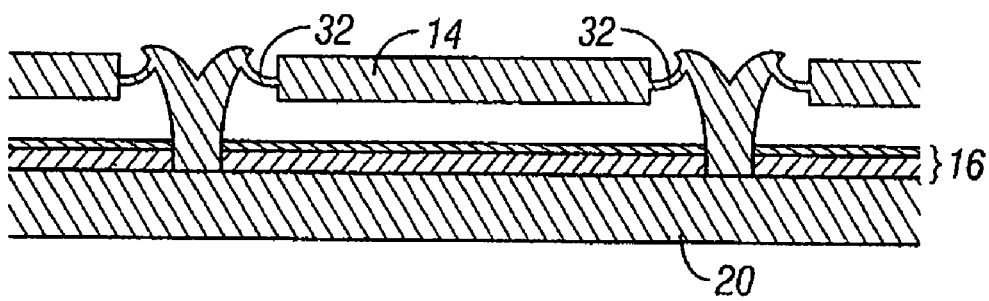
FIG. 7B is a cross section of an alternative embodiment of an interferometric modulator.
Figure 7C:
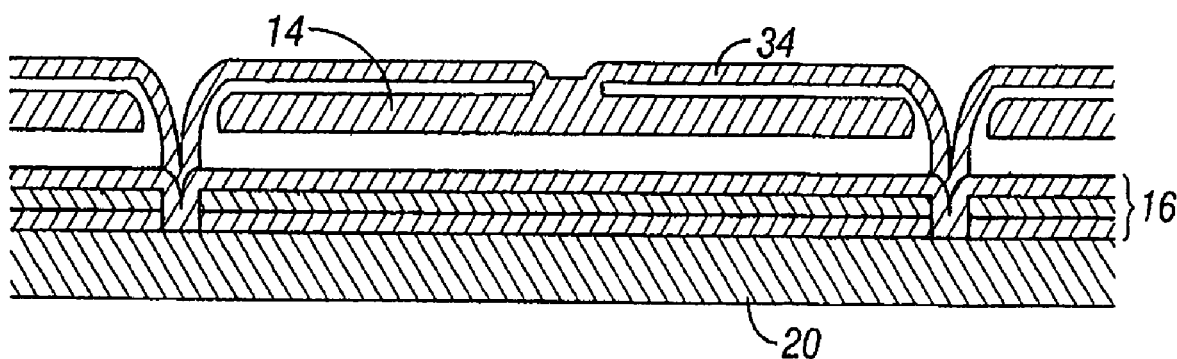
FIG. 7C is a cross section of another alternative embodiment of an interferometric modulator.
Figure 7D:
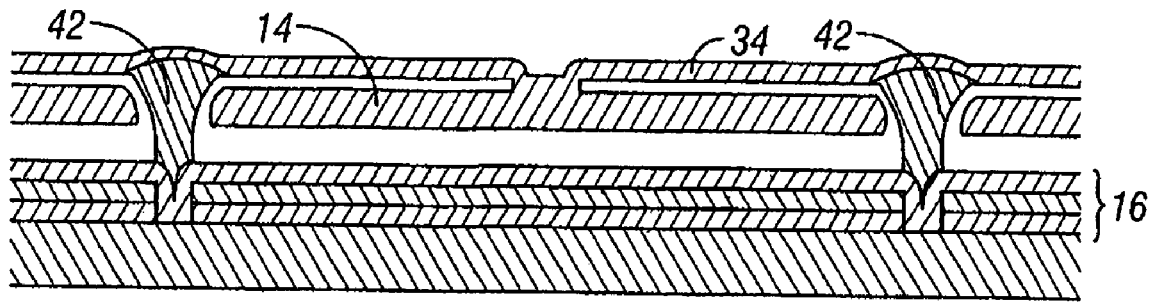
FIG. 7D is a cross section of yet another alternative embodiment of an interferometric modulator.
Figure 7E:
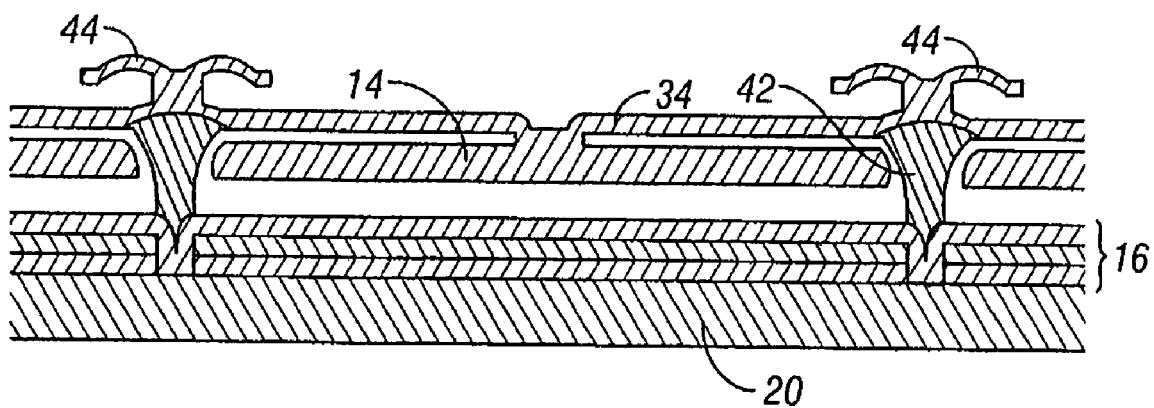
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

One property that can affect an interferometric modulator after it is fabricated is residual stress. In an interferometric modulator comprising a deformable portion or structure (e.g., a movable or deformable membrane) which has been mechanically released during the fabrication process, the residual stress determines, at least in part, the resulting geometry of the deformable portion, e.g., the amount of deformity of the movable membrane. Excessive residual stress in an interferometric modulator can affect deformation properties of its movable membrane, and correspondingly can affect its ability to interferometrically modulate light.

Figure 17:
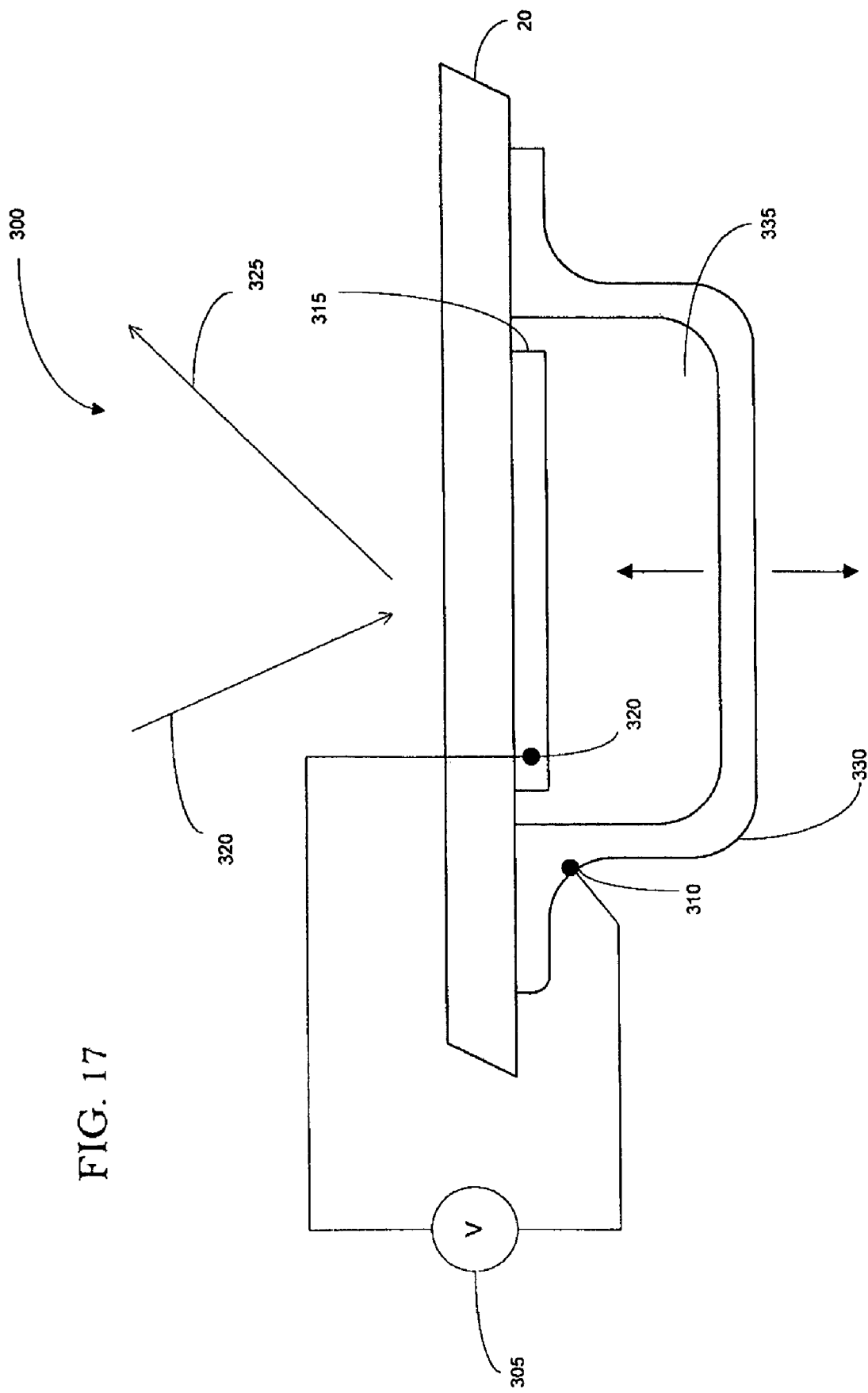
FIG. 17 is a side plan view depicting an embodiment of a test unit used for indicating residual stress.

Controlling residual stress can be a factor in designing the interferometric modulator, in selection of the material used to make the interferometric modulator, and in designing or selecting a fabrication process to manufacture the interferometric modulator. Determining a degree or amount of residual stress in interferometric modulators that is caused by a particular fabrication process can be useful to control fabrication of subsequent interferometric modulators, and this information be used to minimize any undesired effects of residual stress. Because a deformity in a movable structure can indicate its residual stress, a measurement of the amount of deformity of a movable portion of an interferometric modulator can be used to determine its residual stress. Means for measuring the deformity of a structure and determining the corresponding residual stress indicated by such a deformity are described in further detail hereinbelow. Various embodiments of interferometric modulators that can be used to measure residual stress are sometimes referred to herein as "test structures" or "test units." In some embodiments, such interferometric modulators are not configured to have a movable portion (e.g., membrane) that is deformed by an actuation voltage, but instead the movable portion is deformed by the residual stress. In some embodiments, the movable portion is configured to be moved by an applied voltage to achieve a resonant state (but not an actuation state), and this movement is used to indicate residual stress, for example, as illustrated in FIG. 17 and described hereinbelow.

The residual stress in film(s) comprising the deformable membrane of a test structure can be found by determining the amount of deformity exhibited by the membrane and correlating it with predetermined data and information about the test structure (e.g., its structure and/or material composition). The strain in a structure at a point describes the deformation of the structure at that point. For example, the ratio of the deformation (Δl) over the length of a structure (l) is the strain e (i.e., e=(Δl)/l).

Two equations useful for evaluating the resonance frequency in a test unit are shown in Equations 1 and 2 below. Equation 1 shows a frequency relationship for a membrane of a test unit connected on one of its sides (e.g., configured as a cantilever):

$$f = 0.1 \frac{h}{L^2} \sqrt{\frac{E}{\rho}} \qquad \text{Eq. 1}$$

Equation 2 shows a frequency relationship for a membrane of a test unit connected on two portions of the membrane where the portions are on opposite sides of the membrane (a "fixed-fixed beam" configuration):

$$f = \frac{\pi}{2\sqrt{12}} \frac{h}{L^2} \sqrt{\frac{E}{\rho}} \left[ \sqrt{1 + \frac{12\sigma_R L^2}{\pi^2 E h^2}} \right] \qquad \text{Eq. 2}$$

In these equations, f is the measured resonance frequency, $\sigma_R$ is the residual stress of the deposited film (a material with known physical properties), E is Young's modulus, L is the membrane (e.g., movable portion of the deposited film) length, h is the membrane thickness, and ρ is the density of the deposited film. Young's Modulus, sometimes referred to as the Modulus of Elasticity (meaning the "measure" of elasticity) is an important characteristic of a material, and is the numerical evaluation of Hooke's Law, namely the ratio of stress to strain (i.e., the measure of resistance to elastic deformation).

A resonance frequency of a movable membrane of a test structure can be determined by driving the membrane with an AC voltage, or an AC voltage having a DC offset, and with a fixed amplitude and varying frequency (referred to herein as a "frequency scan"), such that the amplitude of the voltage is small enough to allow the membrane to vibrate without actuating. During the frequency scan, light reflected from the test unit (e.g., the "optical signal") is monitored continuously. When the driving voltage frequency hits the resonance frequency of the membrane, the membrane vibrates at an increased amplitude and produces a significantly different optical signal, causing a marked shift in the color of light reflected by the test unit. Provided material properties and the geometry of the test structure is known, a residual stress value can be determined from the measured resonance frequency. Elastic modulus and/or density can be taken determined from literature values, or extracted from a measured resonance frequency for a cantilever beam using the equation shown above.

An interferometric modulator can be formed by first depositing areas of a sacrificial material (e.g., molybdenum) on an optical stack, and then depositing a layer of another material, (e.g., silicon, aluminum, nickel, or germanium, gold, chromium, silver, and alloys thereof) over the molybdenum such that a portion of the layer that forms a structure is separated from the optical stack by the sacrificial layer. The fabrication process then removes the sacrificial material to release the structure, often with an anisotropic wet or dry etching techniques. A deformable membrane is formed by the "released" portion of the structure. In embodiments of single fixed beam and fixed-fixed beam (e.g., attached on a single side and two sides of the deformable membrane, respectively), the fabrication process can etch away material under the structure by accessing the material from a side of the structure. In embodiments where the structure is attached to on all four sides (e.g., a deformable membrane configured as a square and attached to a surface on each of its sides), an etch hole in the structure can be used to improve access of an etchant for undercutting the structure.

A change in the residual stress of a deformable membrane configured as a fixed-fixed beam can shift the resonant frequency of the deformable membrane. The resonant frequency of such a deformable membrane can be measured by detecting the light modulated by the membrane at the resonant frequency, which provides an indication of the residual stress of the membrane. Deformable membranes configured as fixed-fixed beams can be fabricated easily and inexpensively, and configured in large arrays for use in applications where an interferometric modulator are used for displays, and for other uses. An interferometric modulator's performance is sensitive to variations in the resulting geometry of the deformable membrane. For example, the color of light modulated and reflected by an interferometric modulator is a direct function of the air gap spacing of its interferometric cavity. Because the size of the air gap of an unactuated interferometric modulator is a function of the residual stress, it may be used as a direct indication of the residual stress.

As discussed above, one approach to measuring residual stress(es) is based on Stoney's equation. However, this technique provides only an average value across the wafer and has certain constraints on deformable membranes and substrate thickness, substrate diameter, and film residual stress as it is valid only for small deformations. Some approaches for residual stress monitoring include mechanical passive strain sensors, rotating and spiral test structures, ring structures, and nanoindentation on suspended structures. As an alternative approach, opto-electromechanical devices and interferometric modulators, such as the ones described and illustrated herein, can be used for monitoring residual stresses in deformable membranes.

The presence of residual stresses in an interferometric modulator can affect its performance and reliability. For example, variations in the air gap distance along the length of the interferometric cavity 19 (FIG. 1) caused by residual stress can result in unacceptable variations in the color of light reflected by the interferometric modulator. On the other hand, this property is a useful tool in determining the residual stress of the structure itself, because the variations in the color of the reflected light can be used to determine the variations and degree of deformation in the membrane. To facilitate interferometric modulator performance and process control during fabrication, residual stress can be measured on the panel/wafer level, and variations of residual stress in film(s) comprising the deformable membrane, and can be monitored across the wafer, from wafer to wafer, and from one wafer lot to another.

Knowing the deformed state of a membrane allows for a determination of residual stress using information of deformity characteristics of the membrane material. The light modulated by a deformed membrane in such a residual stress "test unit," where the deformity is not due solely to actuation, can be detected and correlated with known information to determine a measure of residual stress. Computer modeling programs and algorithms can use two-dimensional data on the deformation state of the material used to form a deformable membrane to determine the residual stress for a particular exhibited deformity. A suitably configured interferometric modulator can be used to indicate residual stress by monitoring its deformity where the deformity monitoring is based on light reflecting from the interferometric modulator. Such interferometric modulators, referred to herein as "residual stress test units" or simply "test units" can be employed to measure residual stress in one direction, in two orthogonal directions, or an average of the residual stress in multiple directions.

Figure 8:
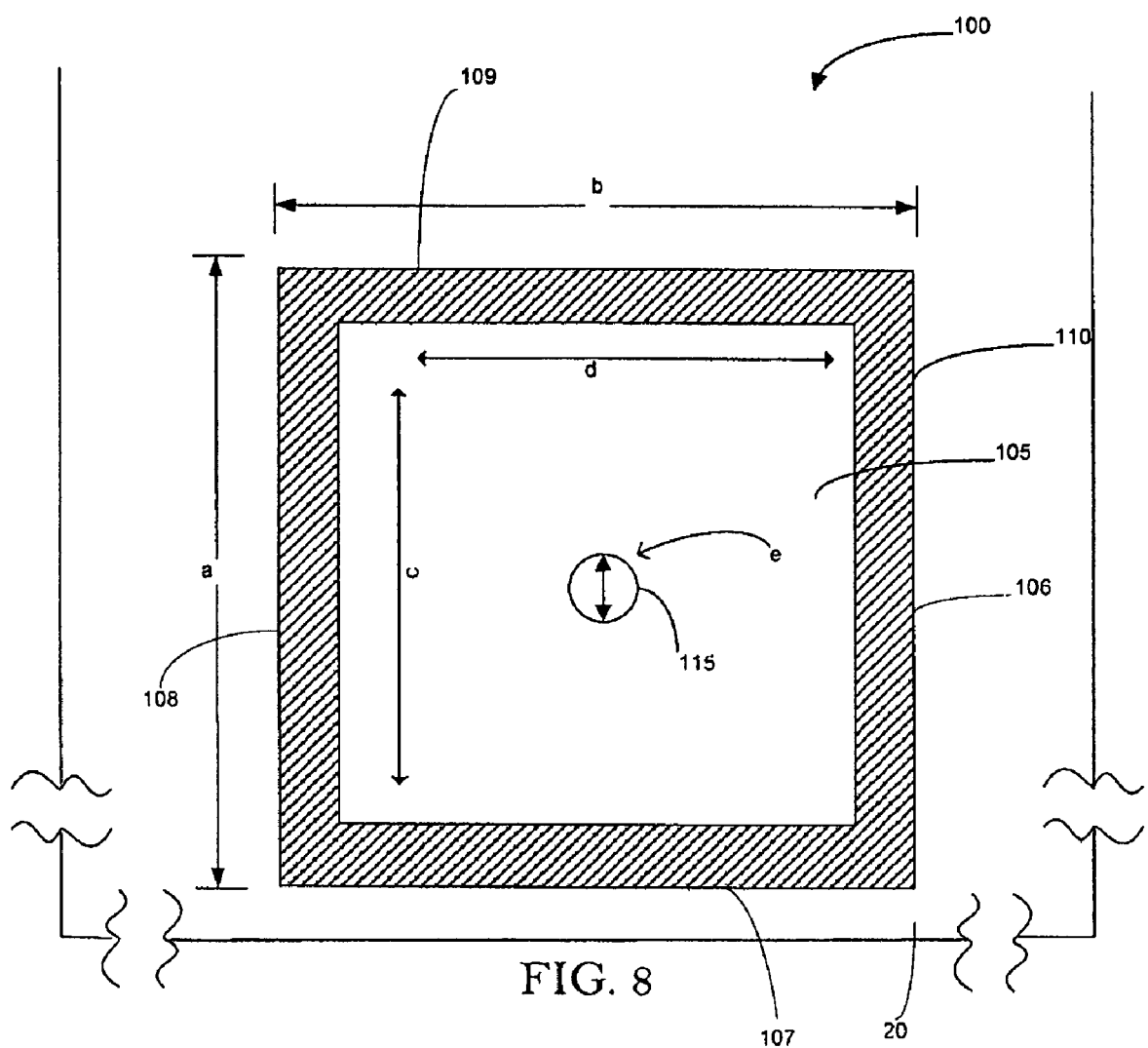
FIG. 8 is a top plan view illustrating one embodiment of a test unit for indicating residual stress.

FIG. 8 is a top plan view illustrating one example of a test unit 100 for indicating residual stress of film(s) comprising a deformable membrane 105. Such a test unit may also be referred to herein as a process control monitor ("PCM"). The test unit 100 is attached to a substrate 20 on which one or more other interferometric devices can also be attached. "Attached to" is used broadly herein to describe that a test unit is affixed to a surface and includes embodiments where the test unit is affixed to a layer (or film) which may then be affixed to or connected to a surface (e.g., the substrate 20), and further includes where the test unit is affixed to one layer of set of multiple layers (e.g., a film stack) that may then be connected to a surface (e.g., a substrate). Unless otherwise specified herein, the description of a test unit attached to the substrate also described embodiments where the test unit is attached to one or more other film layers that are connected to the substrate. Substrate is used herein as a broad term that includes embodiments where the substrate comprises a single material (e.g., glass) and embodiments where the substrate comprises a material (e.g., glass) and at least on other layer (e.g., film stack).

Figure 10:
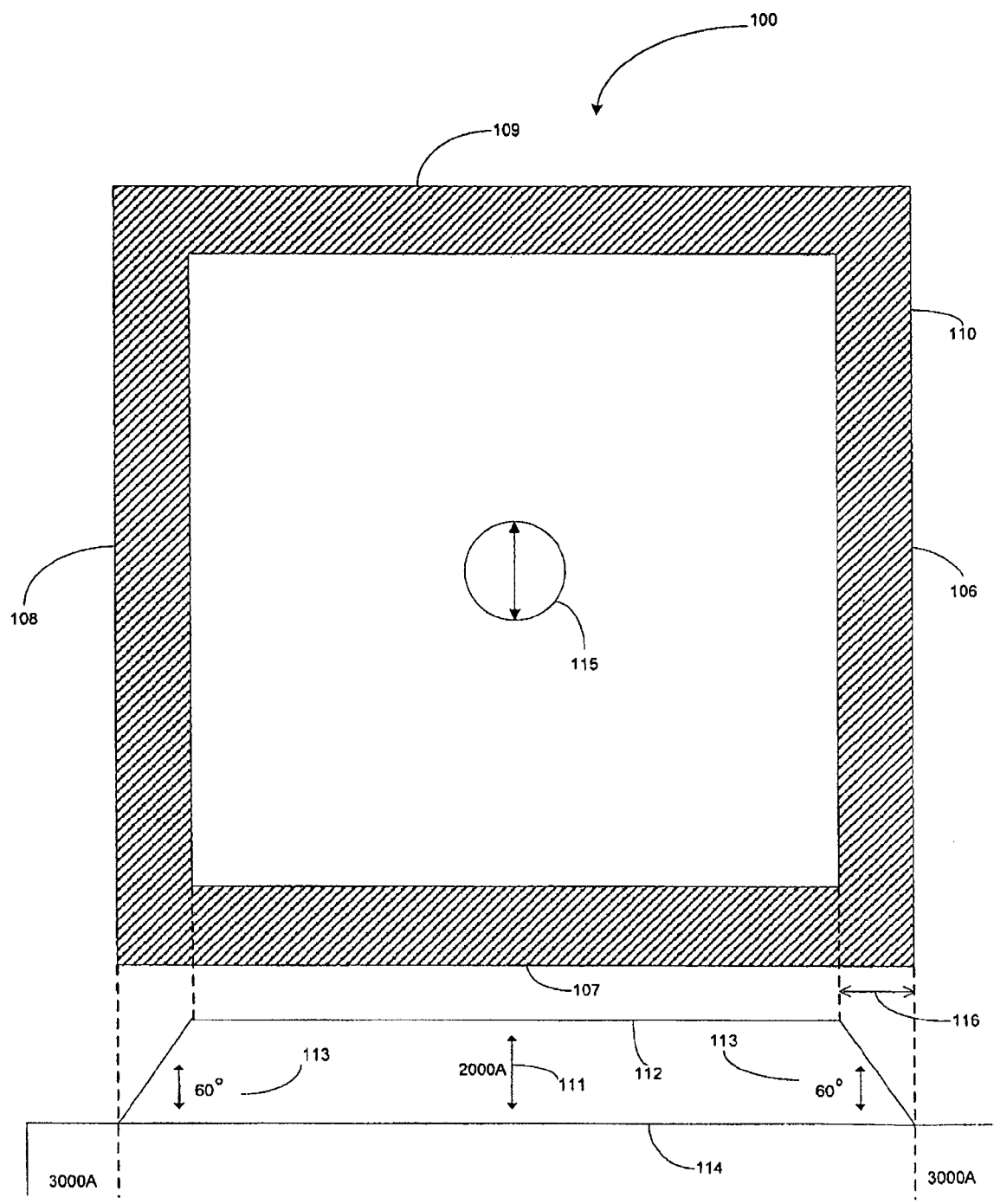
FIG. 10 illustrates exemplary dimensions of the test unit shown in FIG. 8.

The test unit 100 includes the movable highly reflective membrane 105 that is configured to deform based on residual stress (as illustrated in FIG. 8, the membrane 105 includes the interior square with dimensions c×d and the diagonally-lined outer square with dimensions a×b). The membrane 105 illustrated in FIG. 8 is square shaped. Edges 106, 107, 108, 109 of the perimeter of the membrane 105 are attached to the substrate 20. An outer portion 110 (indicated by the diagonal lines) of the membrane 105, the outside edge of the outer portion 110 being the perimeter of the membrane 105 and attached thereto, is angled away from the substrate 20 (e.g., above the substrate) such that a non-perimeter portion of the membrane 105 is not connected to the substrate 20. FIG. 10 further illustrates this configuration. FIG. 10 depicts the test unit 100 illustrated in FIG. 8, and shows that for this embodiment, the angle 113 formed between the outer portion 110 of the membrane 105 and the surface it is attached to (e.g., substrate 20) is 60 degrees, which results in a 2000 Å separation 111 between a surface 112 of the membrane 105 facing the substrate 20 and a surface 114 of the substrate 20 facing the membrane 105. The separation 111 described here refers to the separation of the membrane 105 from the substrate 20 resulting from the manufacturing of the test unit 100. When the membrane 105 of the test unit 100 deforms to indicate residual stress, the separation 111 changes. The angle 113 affects the manufactured separation 111 of the membrane 105 and the substrate 20 (e.g., the larger the angle the greater the separation) and can be determined based on, for example, the size of the test unit 100, manufacturing characteristics, the material(s) used to fabricate the test unit, the amount of membrane 105 deformity desired (or required), and/or the particular application of the test unit 100. The manufactured separation 111 between the membrane 105 and the substrate 20 is affected by the angle 113 selected and length 116 of the angled outer portion 110 of the membrane 105. Determination of the separation 111 can be based on, for example, the size of the test unit, manufacturing characteristics, material(s) used to fabricate the test unit, the amount of membrane 105 deformity desired (or required), and/or the particular application of the test unit 100.

In alternative embodiments, the membrane 105 can be configured in other shapes that are also suitable to indicate residual stress, for example, the deformable membrane can be configured as a rectangle, a parallelogram, a trapezoid. In some embodiments, the membrane 105 can be configured in another shape with opposing edges that are attached to the substrate 20. Such membranes can be attached to a supporting surface by one or more edges of the membrane, depending on the application of the test unit. The membrane in a test unit for measuring residual stress in one direction of a substrate can be attached to the substrate on at least a portion of one edge of the membrane, or the membrane can be attached to the substrate by opposite edges of the membrane, as described in reference to FIGS. 13-15.

For test units that are configured to measure average residual stress in two orthogonal directions, such as the test unit 100 in FIG. 8, the membrane 105 is attached to the substrate 20 by at least a portion of it four perimeter edges, e.g., at least a portion of a first set of opposite edges 106, 108 and a second set of opposite edges 107, 109 are attached to the substrate 20, the direction between the first set of edges 106, 108 and the second set of edges 107, 109 being orthogonal to each other. For some embodiments, and for test unit 100 in FIG. 8, the entire perimeter is attached to the substrate 20, forming two sets of opposite edges of the membrane that are attached to the substrate 20, the sets of edges being orthogonal to each other. Test units can be configured to indicate an average residual stress resulting from residual stress in two orthogonal directions by placing two test units, each having two opposed edges attached to the substrate, in orthogonal orientations determining the residual stress in each of the orthogonal directions, and combining the results to determine an average residual stress. The test unit 100 is an example of a single test unit configured to indicate the average of residual stresses in two directions, where the light reflected by the test unit 100 indicates the average residual stress without having to combine the results with another test unit.

Referring again to FIG. 8, the test unit 100 also includes an etch hole 115 disposed in the membrane 105. The etch hole 115 is shown here located in the center of membrane 105. The etch hole 115 allows access to the portion of the test unit 100 between the membrane 105 and the substrate 20 and is used in manufacturing the test unit 100. In some embodiments, the etch hole can be located at any suitable location on the membrane to allow access to the portion of the test unit 100 between the membrane 105 and the substrate 20 by an etching substance. To manufacture the test unit 100, a sacrificial layer can be deposited on a portion of the substrate 20 in the location desired for the test unit is desired. The depth of the sacrificial layer will determine the amount of separation 111 (FIG. 10) between the finished membrane 105 and the substrate 20, and affects the angle 113 (FIG. 10) at which the membrane 105 is attached to the substrate 20. A layer of material (for example, aluminum, nickel, germanium, gold, chromium, silver, and alloys thereof is then deposited over the sacrificial layer forming the membrane 105. The membrane 105 is configured with an etch hole 115 exposing the sacrificial layer. An etching substance introduced at the etch hole 115 removes the sacrificial layer between the membrane 105 and the substrate 20 to form an interferometric cavity through which the membrane 105 can move (e.g., towards the substrate 20) to achieve certain deformed states based on residual stress. Removing the sacrificial layer also allows the membrane 105 to deform such that it can move away from the substrate 20 based on residual stress. Movement of the membrane 105 interferometrically modulates light passing through the substrate 20, and light reflected by the test unit 100 indicates residual stress of the substrate 20. By detecting this light and using known characteristics of the membrane, a value of residual stress substrate can be determined, as described with reference to FIG. 9 below.

Figure 9:
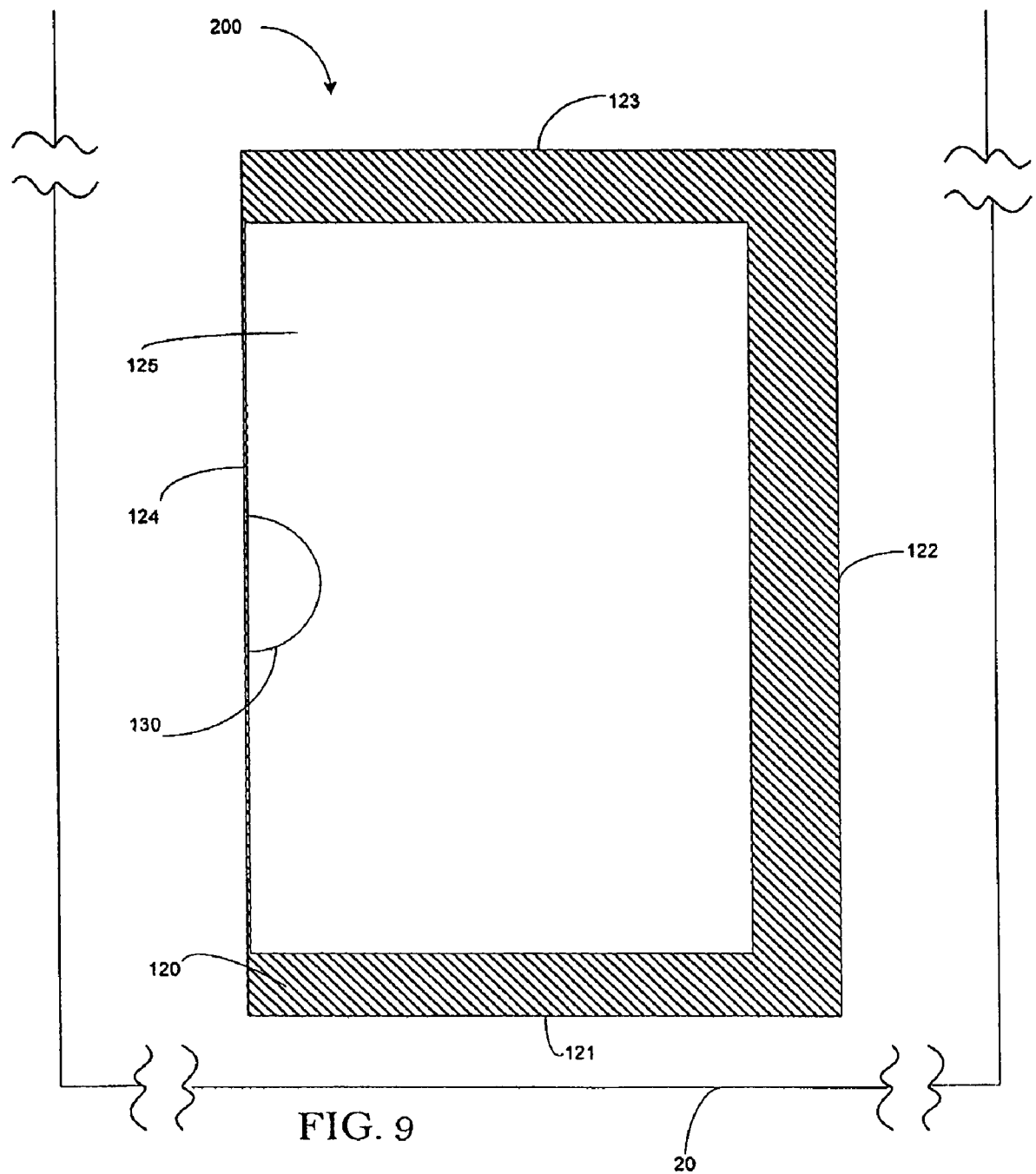
FIG. 9 is a top plan view illustrating an alternate embodiment of a test unit for indicating residual stress.

FIG. 9 is a top plan view illustrating an embodiment of a test unit 200 for indicating residual stress of a substrate in one direction. The test unit 200 is attached to a substrate along its perimeter edges 121, 122, and 123 of a membrane 125. Test unit 200 differs from the test unit 100 illustrated in FIG. 8 in that test unit 200 has only one set of opposing edges 121, 123 connected to the substrate. In such a configuration, test unit 200 indicates residual stress in a single direction, e.g., in the direction from one connected edge 121 to the opposed connected edge 123. The test unit also includes an etch hole 130 in the membrane 125 allowing access to etch sacrificial material between the membrane 125 and the substrate 20 during fabrication of the test unit 200.

Other fixed-fixed beam structures based on displacement or rotation may be used to determine stress, however, they may be more suitable for thicker films than what is being used in interferometric modulators. For example, in some cases when those structures have been generated based on the process of generating an interferometric modulator, they simply did not survive after an etch (e.g., XeF2) release process.

Figure 11:
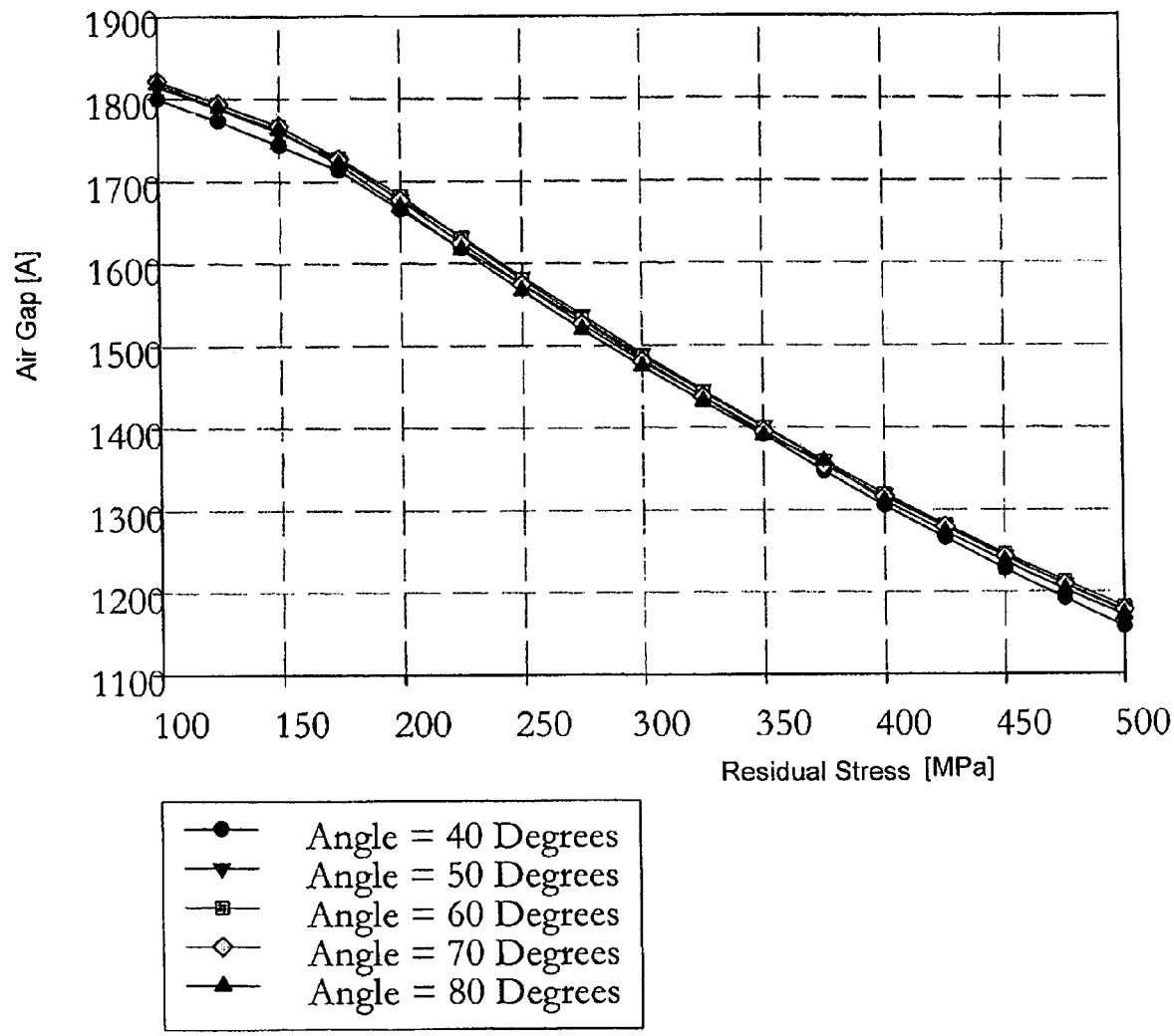
FIG. 11 is a graph illustrating air gap vs. Ni stress for various attachment angles.

The section below describes finite element analysis (FEA) of a 40×40 µm² 4-sided structure, as an example for the feasibility of this test unit for indicating residual stress in film(s) comprising the deformable membrane. As described above, the test unit 100 in FIG. 8 includes a thin membrane 105, made of highly reflective material, which is fixed on its perimeter and suspended above a substrate with a certain air gap. After etch-release process (through the etch hole) the membrane deflects and out-of-plane displacement occurs, which affects the air gap between the membrane and the substrate. The interferometric modulator device selectively absorbs and/or reflects light using the principles of optical interference and, therefore, changes in the air gap of the test structure results in variations of the color it produces. The air gap can be extracted by measuring and analyzing this color, specifically by fitting the measured optical spectrum (reflectance vs. wavelength) to a calculated spectrum with the air gap being the only variable. FEA has been performed to study the relationship between air gap and membrane design (dimensions and elastic properties) and its isotropic residual stresses. A membrane was considered with elastic modulus E=210 GPa and thickness t=1000 Å, with a nominal residual stress in the layer was assumed to be σ=300 MPa. To determine the air gap if a test unit is sensitive to the taper angle (e.g., the angle 111 between the membrane 105 and the substrate 20 in FIG. 10) such that different angles could lead to misleading stress results, an analysis was done with various taper angles in the range of 40 to 80°. FIG. 11 is a graph illustrating Air Gap vs. Ni stress for various attachment angles of a movable membrane on a substrate. The deformity of the membrane is based on the residual stress, and causes the air gap between the membrane and the substrate to also change due to the residual stress. Analysis of this data shows the average air gap (over a 25 µm circular spot concentric to the etch hole) as a linear function of the Ni stress, with sensitivity (slope) of 15 Å/10 MPa. Since air gaps can be determined using high resolution measuring systems with accuracy of 30 Å, stresses can be determined with an accuracy of 20 MPa. If we assume nominal Ni stress to be 350 MPa, this resolution is roughly 6% of the nominal Ni stress. The air gap is practically independent of anchor taper angle and membrane lateral dimensions, which may be important for robust stress test structures.

Figure 12:
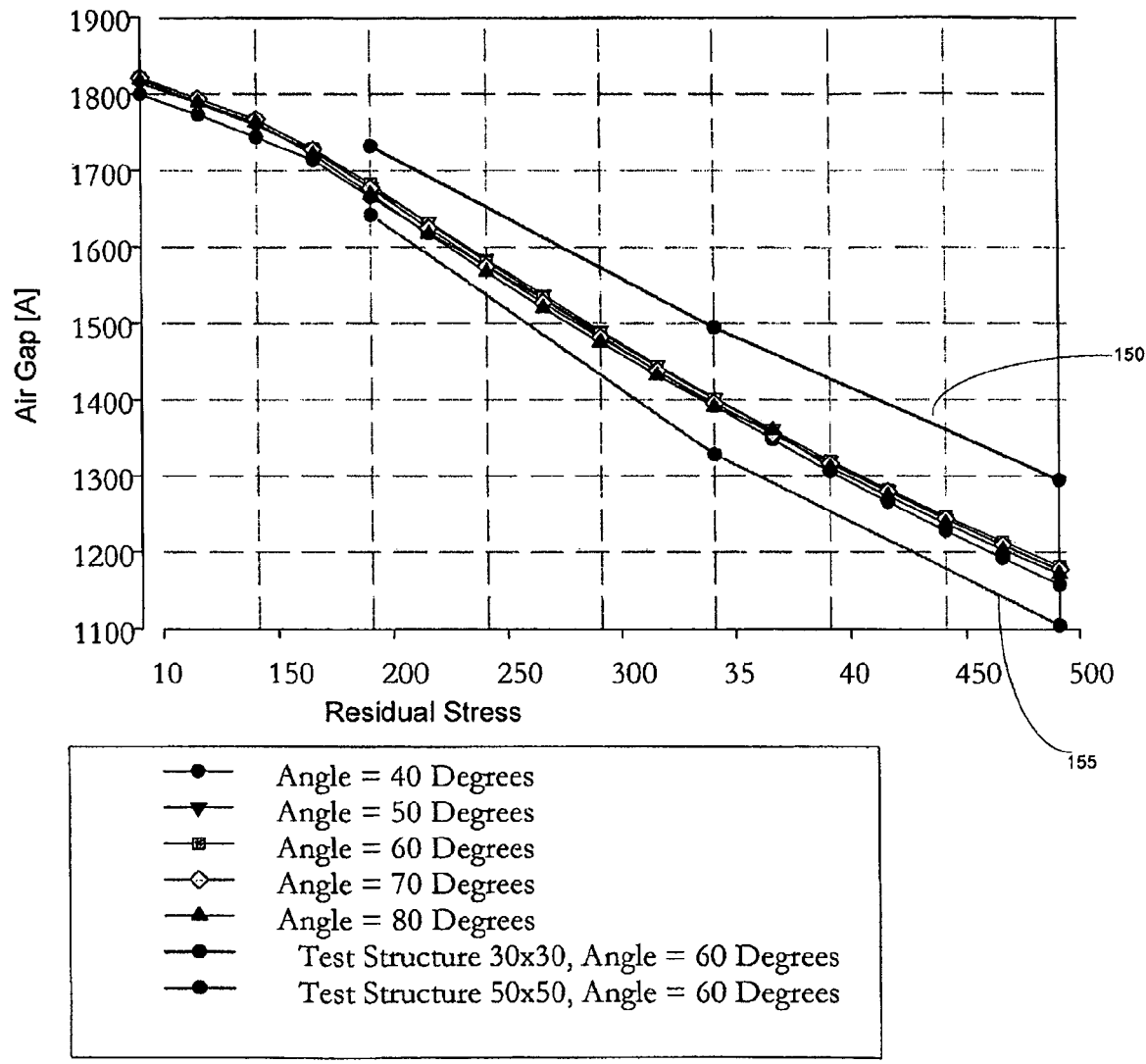
FIG. 12 is a another graph illustrating air gap vs. Ni stress for various attachment angles and test unit dimensions.

FIG. 12 is a another graph illustrating Air Gap vs. Ni stress for various attachment angles and test unit dimensions. The results illustrate that the air gap is practically independent of the Mo taper angle and had the a sensitivity of 15 Å/10 MPa. FEA was also performed on different sizes of test units (e.g., 30×30, and 50×50) to reveal differences in the air gap caused by the size of the test unit. The air gap/stress relationship for the 30×30 test unit is shown in plot 150, and for the 50×50 test unit in plot 155. In these tests, the air gap was also linearly related to the residual stress, but the size of the air gap was different, due to the larger membrane size which allowed for more movement of the membrane.

Figure 13B:
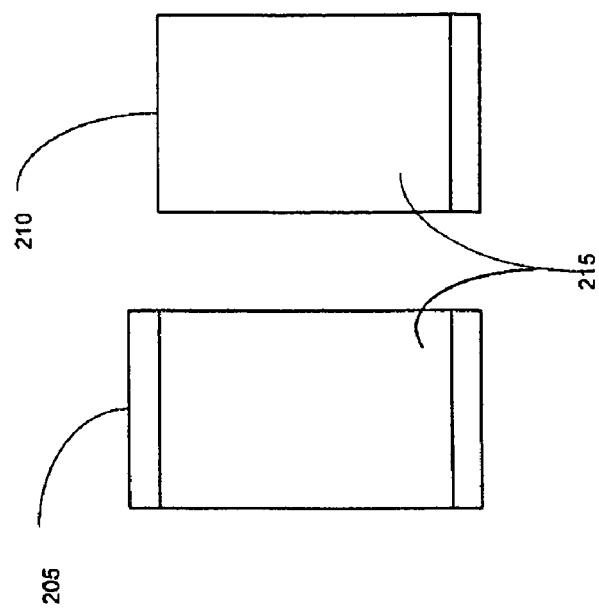
FIG. 13B is a schematic representing a top plan view from the side of the substrate illustrating a pattern of modulated light from the exemplary test units illustrated in FIG. 13A.
Figure 13A:
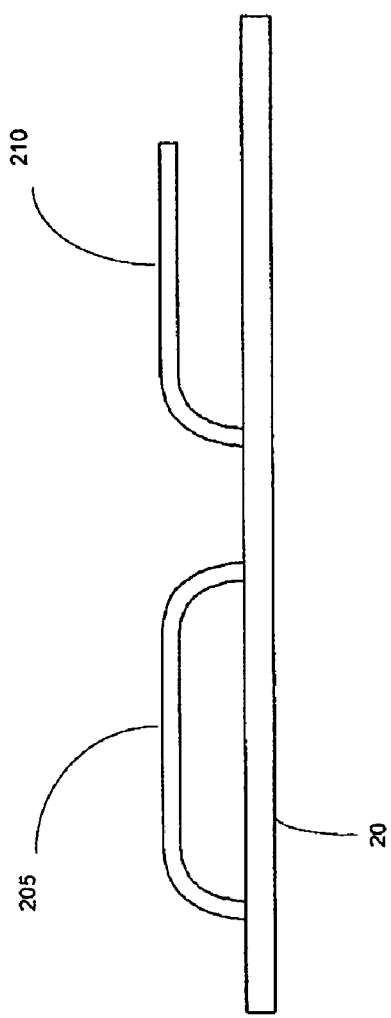
FIG. 13A is a side plan view illustrating two embodiments of test units in a first state of stress.
Figure 14B:
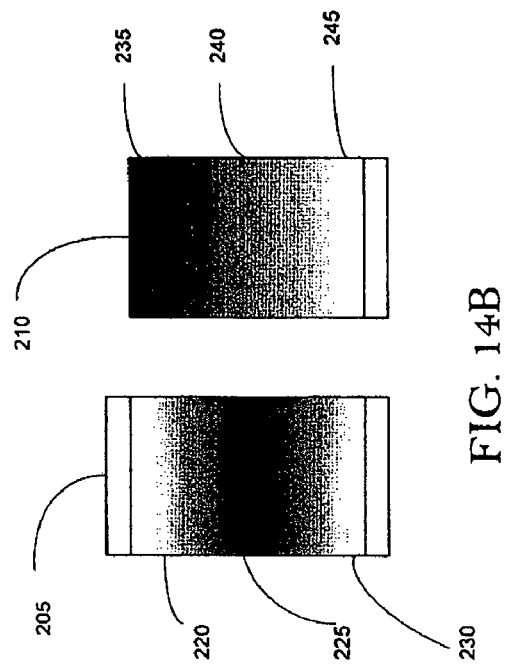
FIG. 14B is a schematic representing a top plan from the side of the substrate illustrating a pattern of modulated light from the exemplary test units illustrated in FIG. 14A.
Figure 14A:
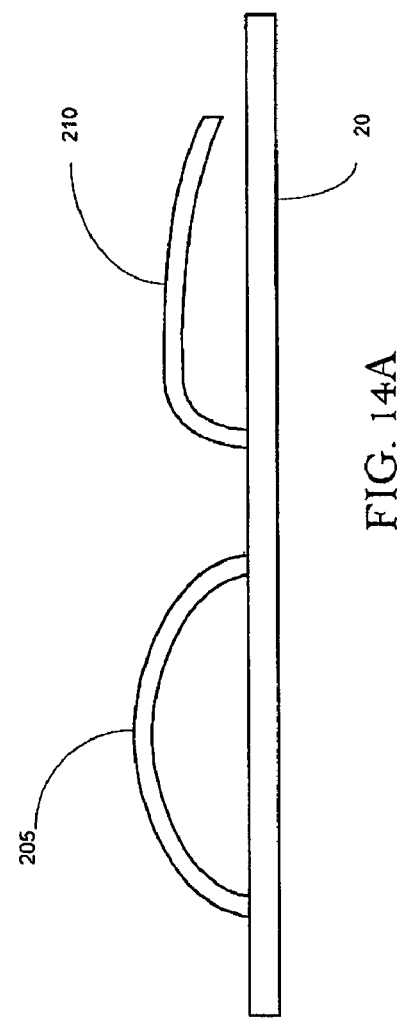
FIG. 14A is a side plan view illustrating two embodiments of tests units in a second state of stress.

FIGS. 13-15 illustrate embodiments of two test units 205 and 210 in various states of stress. Test units 205 and 210 are of a fixed-fixed beam and single fixed beam respectively. FIG. 13A is a side plan view illustrating two embodiments of test units in a first state of stress. FIG. 13B is a schematic representing a top plan view from the side of the substrate opposite of the side on which the test unit is configured (e.g., viewed through the substrate), illustrating a pattern of modulated light from the exemplary test units 205, 210 illustrated in FIG. 13A. In FIG. 13A, the membrane of the test units 205, 210 has no residual stresses other than a nominal residual stress, and both membranes exhibit no deformation. As viewed through the substrate, the test units 205, 210 exhibit a uniform color (e.g., uniformly modulated light) that is determined by the thickness of the spacer layer upon which they were formed. In FIG. 14A, test units 205 and 210 are shown with a stress gradient that is more compressive on the top than it is on the bottom. The membranes exhibit a deformation as a result, and the bottom view illustrated in FIG. 14B reveals the nature of a change in modulated light that could result from the membrane deformation. For example if the test unit 205 could modulate light such that color regions 230 and 245 were green, then color region 235 might appear blue because it is closer to the substrate. Conversely, for test unit 205, color region 225 might be red because it is farther away from the substrate, and region 220 could appear green because the corresponding part of the membrane is at the same distance from the substrate 20 as for region 230. In FIG. 15A, test units 205 and 210 are shown in a state where the stress gradient exhibits higher tensile stress on the top than on the bottom. Under such circumstances, the structural members are be deformed as illustrated. FIG. 15B shows the change in modulated light (color) from the test units that results in the change in residual stress. In this case, the corresponding light modulation could result in the test unit 205 region 250 to appear red, region 255 could be blue, and region 260 could also be red. For test unit 210, region 275 could be blue and region 265 could be red, indicating that portion of the membrane is farther away from the substrate.

Figure 16B:
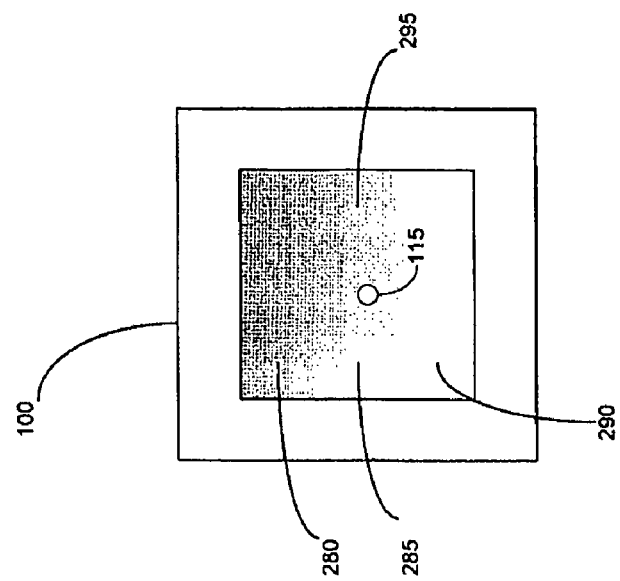
FIG. 16B is a schematic representing a top plan from the side of the substrate illustrating a pattern of modulated light from the exemplary test units illustrated in FIG. 16A.
Figure 16A:
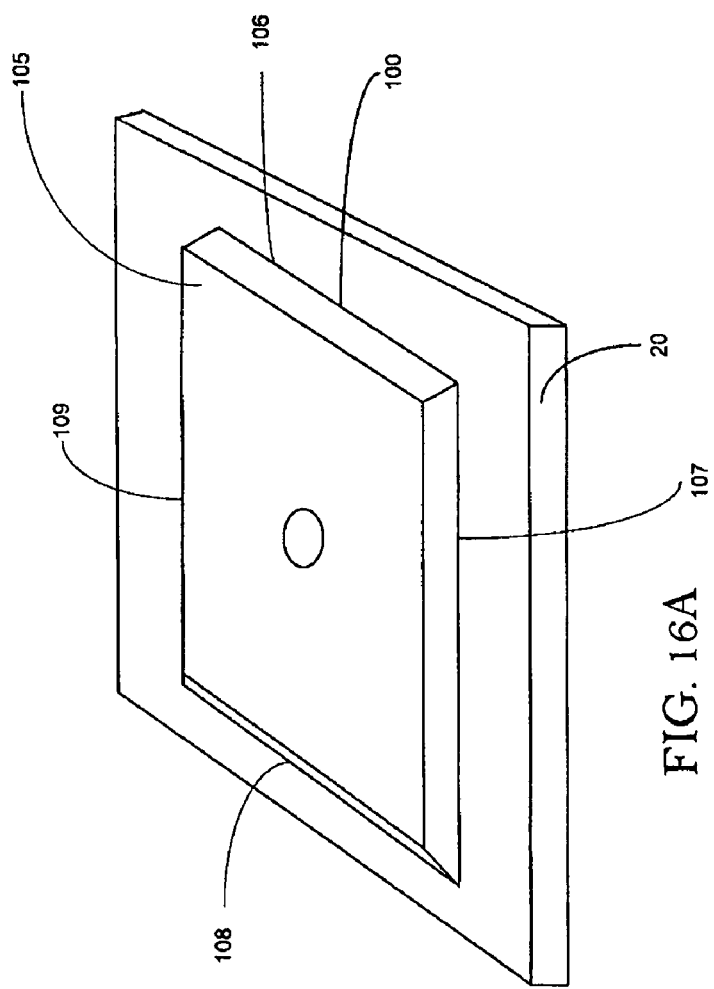
FIG. 16A is a perspective view of the test unit illustrated in FIG. 8.

FIG. 16A is a schematic of a perspective view of the test unit 100 illustrated in FIG. 8. FIG. 16B is a schematic representing a top plan from the side of the substrate (e.g., viewing the test unit 100 through the substrate) illustrating an example of a pattern of modulated light reflected from the test unit 100 when the film(s) comprising the deformable membrane exhibits certain residual stress. Because all sides of the test unit 100 are attached to the substrate 20, the deformity of the membrane 105 causes light reflected light from the test unit 100 to indicate an average of the residual stress in multiple directions of the membrane. In one example, assuming the deformable membrane in FIG. 16A is at a certain non-nominal residual stress state, the certain sections of the membrane 105 will deform corresponding to the residual stress, and the corresponding reflected light is represented in FIG. 16B. Referring to FIG. 16B, the region 290 represents a portion of the membrane 105 that is closer to the substrate 20 and could appear blue. Regions 285 and 295 may represent a portion of the membrane 105 that is deformed so that it is farther from the substrate 20 than region 290, and may appear green. Region 280 may represent a region of the membrane 105 that is still farther away from the substrate 20, and may appear red. Through predetermined information relating to membrane deformity (e.g., based on its material composition and structure), the resulting modulation of light that occurs based on the deformity, and correlation data between membrane deformity and the residual stress of the particular film(s) comprising the membrane being tested, residual stress information of the film(s) can be determined by correlating the light reflected by the test unit to a membrane deformity, and then to a residual stress value(s).

FIG. 17 is a side plan view depicting an embodiment of a test unit 300 used for indicating residual stress of the film(s) comprising the deformable membrane. The test unit 300 includes a membrane 330 attached to a substrate 20 on two of its edges forming an interferometric cavity 335 between the membrane 330 and the substrate 20. The test unit 300 also includes a voltage source 305 that is connected to the membrane 330 and an electrode 315. The electrode 315 is connected to the substrate 20 and is formed from a material that is partially transparent and partially reflective. In some embodiments, the electrode 315 comprises several fused layers, which can include an electrode layer, such as indium tin oxide (ITO), a partially reflective layer, such as chromium, and a transparent dielectric. The electrode 315 is electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and/or dielectrics. The partially reflective layer comprises one or more layers of materials, each of the layers comprising a single material or a combination of materials. In some embodiments, the electrode 315 can be formed as the optical stack 16 (FIG. 1).

The voltage source 305 is configured to provide a potential difference between the electrode 315 and the membrane 330 that causes the membrane 330 to deform and resonate at a particular frequency and at a particular amplitude. Test unit 300 is configured such that the membrane 330 deforms (e.g., vibrates) at a particular resonant frequency when a voltage is applied across the membrane 330 and the electrode 315, where the resonant frequency is based on the residual stress of the membrane 300. The applied voltage can be an AC voltage, or a combination of AC and DC voltages, that are smaller than an actuation voltage so that the test unit 300 does not actuate. In one example, the applied voltage is a sinusoidal voltage (e.g., AC voltage) with an amplitude of one volt. In some embodiments, the amplitude of the applied voltage can be between 0.1 volts and 5 volts, or more, so long as it is below the actuation voltage. The frequency of the applied voltage is swept (or scanned) over the a predetermined frequency range to find a frequency that causes the membrane 330 to deform and resonate. The vibration amplitude will be largest at resonance frequency, and the large membrane deformity is indicated in corresponding optical signal (light) from the test unit, which can be detected using a high resolution imaging system, such as described in reference to FIG. 19.

Figure 18:
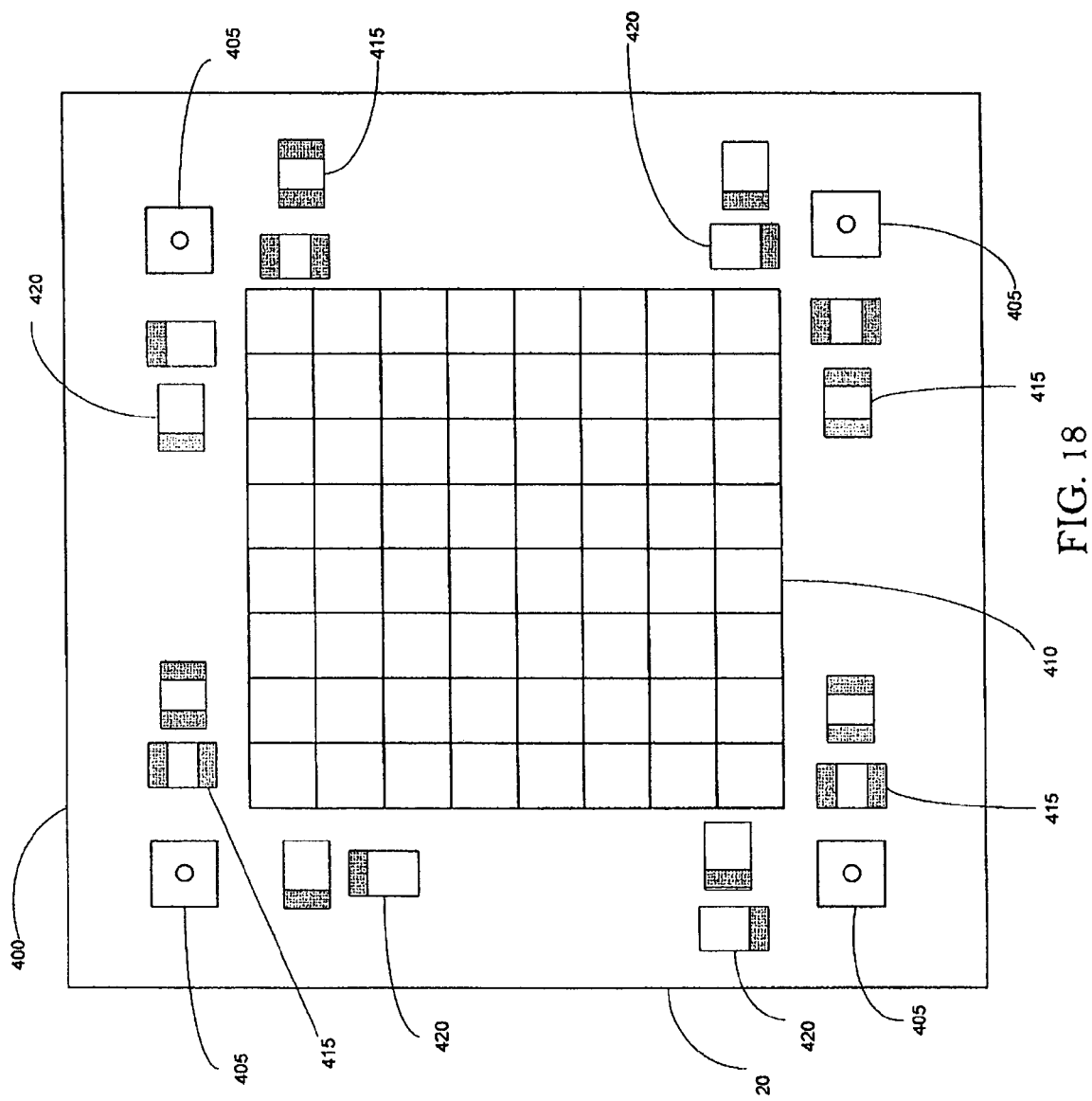
FIG. 18 is a top plan view illustrating one embodiment of a display configured with a test unit for indicating residual stress located near each corner of the display.

FIG. 18 is a top plan view illustrating a display device 400 having a display or panel 410 that can be configured with one or more test units for indicating residual stress at different locations surrounding the panel 410. The panel 410 may comprise an array of interferometric modulators and be configured similar to the panel 30 shown in FIG. 2. The display device 400 can include driving circuitry (not shown) for the panel 410 that includes a processor, an array driver, a column driver circuit and a row driver circuit, and can be configured, for example, similar to the electronic device shown in FIG. 2. In some embodiments, the display can be another type of reflective or transmissive display, for example, LED, LCD, Double-layer SuperTwist Nematic (DTSN), plasma, Thin Film Transistor (TFT), Organic LED (OLED), and Light Emitting Polymer (LEP).

As illustrated in FIG. 18, the display device 400 can include at least one test unit for indicating residual stress at one or more locations on the display device 400. In some embodiments, multiple test units are located near panel 410 to determine residual stress that may affect the display at multiple locations surrounding or near the display. A test unit can be configured to indicate residual stress in one direction such as a fixed beam 420, or a fixed-fixed beam 415, or configured to indicate an average of the residual stress in two orthogonal directions 405, such as test unit 100 (FIG. 8). Test units configured to indicate residual stress in one direction can be orthogonally aligned and used in a pair to indicate stress in two orthogonal directions.

Test units can be located near panel 410 to monitor distributions of residual stresses across the wafer. In some embodiments, four test units 405 are located near each corner of the panel 410 forming a pattern that surrounds the panel 410, as illustrated in FIG. 18. In some embodiments, a single test unit may be used, while in other embodiments two, three or more than four test units are used.

Figure 19:
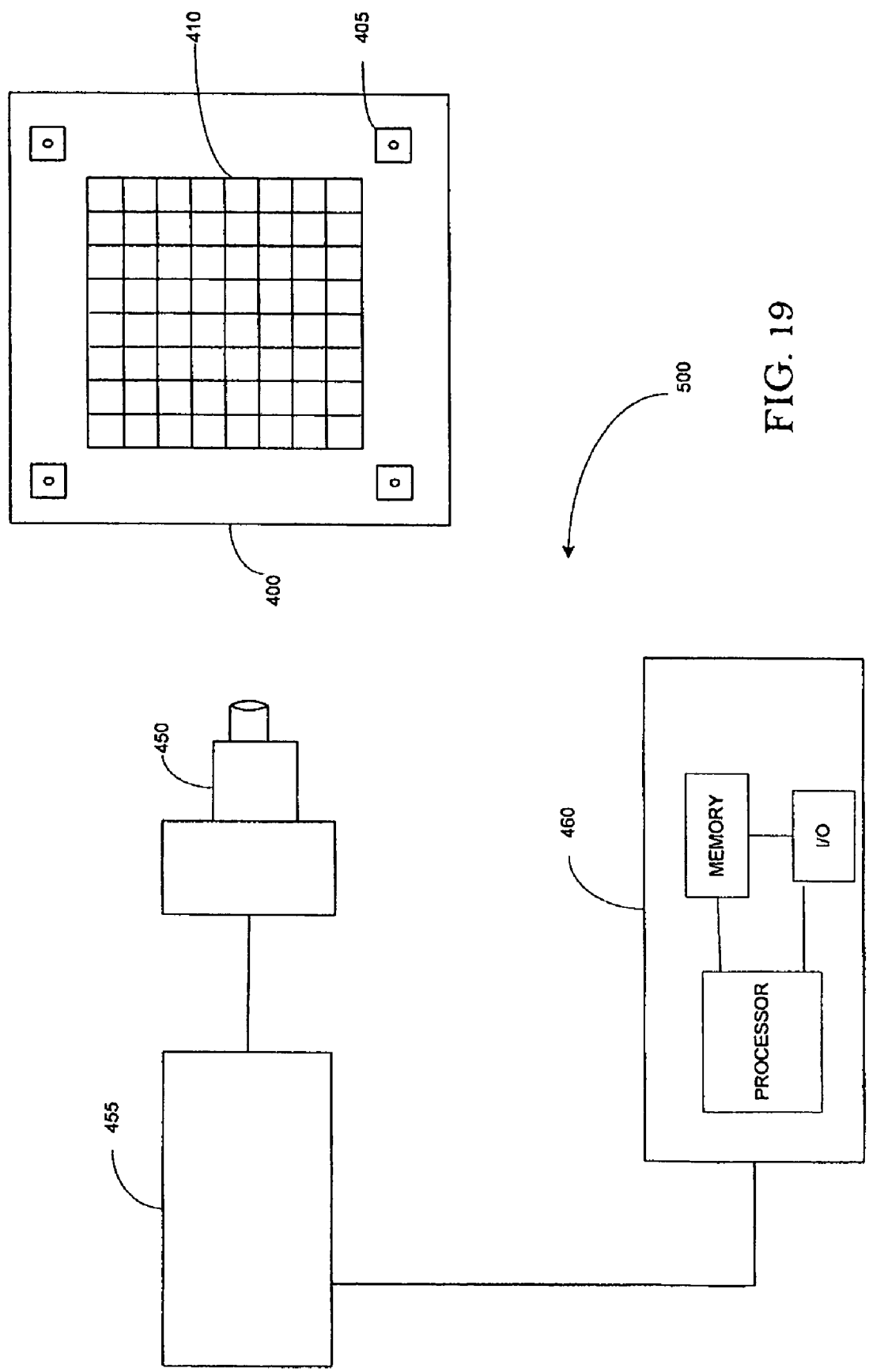
FIG. 19 is a block diagram illustrating a system for determining residual stress.

FIG. 19 is a block diagram illustrating a system 500 for determining the residual stress of test units positioned on a display panel 410. The system 500 comprises an optical device 450 for receiving light reflected from the test units 405. The optical device 450 can be, for example, one or more lenses that receive light from test units 405 and produce a corresponding optical signal. System 500 also includes an imaging device 455 that receives the optical signal from optical device 450 and converts it into electrical signals in the form of an image or image data. The image data can include, for example, chromatic and luminance information of the light reflected by a test unit and modulated by the deformation of a membrane in the test unit. Imaging device 455 can be a high resolution CCD array or another suitable imaging digital imaging device. In some embodiments, optical device 450 and imaging device 455 are embodied together as a high resolution digital camera. In some embodiments, the imaging device comprises a miniature fiber optic spectrometer.

Image data is communicated to a computer 460 which is configured to receive the image data that relates to membrane deformation of the one or more test units 405. Computer 460 can include hardware and software capable of recording and processing the image data, including high speed processing boards capable of performing numerous numerical calculations at high rates of speed. The software may comprise modules to identify relevant color information in the image data and calculate membrane deformation data based on the color information. The processing modules can use the deformation data to determine a combination of uniform stress and stress gradient across the thickness of the membrane which is capable of producing the overall deformity exhibited by the membrane. In this exemplary embodiment, the computer 460 includes a memory component (e.g., RAM, magnetic or optical disc), at least one input/output module, and a processor.

The processor which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor may be configured to execute one or more software modules to determine residual stress information from the image data. In addition to executing an operating system, the processor may be configured to execute one or more software applications, including a web browser, a telephone application, an email program, or any other software application, to convey or communicate results of its processing to a user.

As stated above, color information in the image data can be used to determine the amount of membrane deformation for a test unit. The computer 460 is configured to use the image data to determine a residual stress value corresponding to the membrane deformation using predetermined information about the material used to make the membrane (e.g., silicon, nickel, aluminum, germanium). For the case of a resonating test unit (e.g., as illustrated in FIG. 17), the image data includes color information that corresponds to a certain resonating frequency of the membrane in the test unit. Having predetermined information about the test unit structure, the computer 460 is configured to correlate the color information in the image data to a resonating frequency, and then determine a residual stress value based on the resonating frequency. The results of the residual stress determination can be communicated to a user via a display device or a printed report.

The systems and test units described herein can be used in many different processes relating to the determination of residual stress. One mode of use is to generate a collection of "virgin" test wafers with detailed records of their non-deposited stress states, to be put away for later use. When the need arises to determine the residual stress of a deposited film, a test wafer is selected and the film is deposited on top of it. The deposited film alters the geometry of the structures and consequently their color maps. Using software resident on the computer system, the color maps of the test wafer both before and after may be compared and an accurate assessment of the residual stress in the deposited film made. The test units may also be designed to be actuated after deposition. Observation of their behavior during actuation with the newly deposited films provides more information about the residual stress states and changes in film properties over many actuation cycles.

Such techniques may also be used to determine the stress of films as they are being deposited. With appropriate modification of the deposition system, an optical path may be created (e.g., using optical elements and/or electronic imaging devices) from the test units allowing the imaging system to view structures comprising the deposited film and track the change of their color maps in real time as the film is deposited. Such systems facilitate real-time feedback systems for controlling deposition parameters in an attempt to control residual stress in this manner. Software and hardware may "interrogate" the test wafer on a periodic basis and allow the deposition tool operator to alter conditions as the film grows. Overall such a system can be superior to other techniques for measuring residual stress, which either rely on electromechanical actuation alone, or utilize expensive and complex interferometric systems to measure the deformation of fabricated structures. The former suffers from a need to provide drive electronics to a large array of devices, and inaccuracies in measuring displacement electronically. The latter is subject to the optical properties of the films under observation, and the complexity of the required external optics and hardware.

Figure 20:
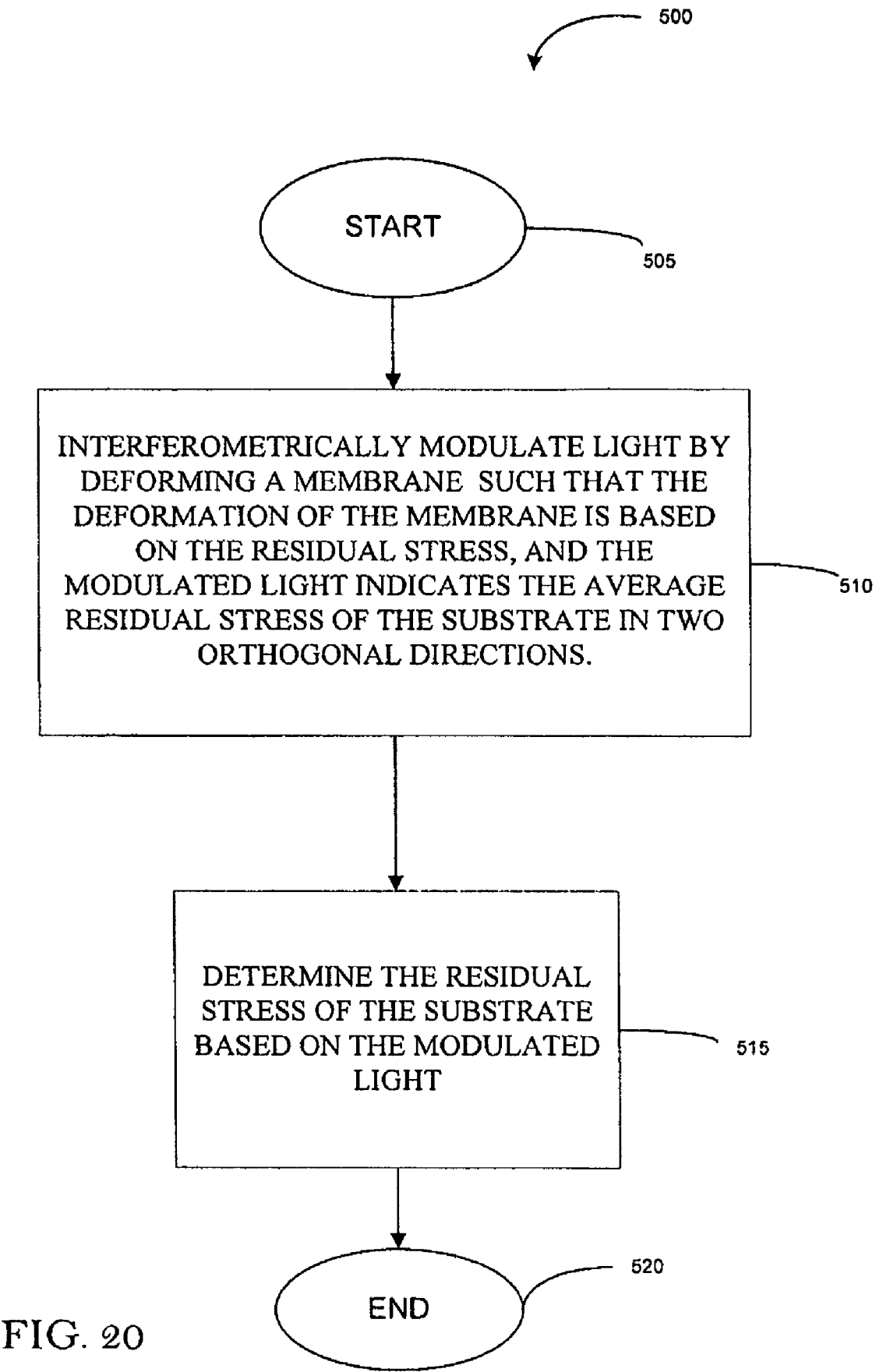
FIG. 20 is a flowchart of a process for determining residual stress of a substrate.

FIG. 20 is a flowchart of a process 500 for determining residual stress in film(s) comprising the deformable membrane. Process 500 starts at state 505 and proceeds to state 510 where it interferometrically modulates light by deforming a membrane such that the deformation of the membrane is based on the residual stress, and the modulated light indicates the average residual stress of the membrane in two orthogonal directions. State 510 can be performed, for example, by employing test unit 100 illustrated in FIG. 8. The process 500 proceeds to state 515 and determines the residual stress of the membrane based on the modulated light. In some embodiments, this step can be performed using the system described in reference to FIG. 19 which receives the modulated light from a test unit, generates corresponding image data that includes color information about the modulated light, and then determines a residual stress value based on the image data and other information (e.g., the materials and/or structure that are used to make the test unit). The resulting residual stress information can be output to a user using a display or a printout, as desired.

Figure 21:
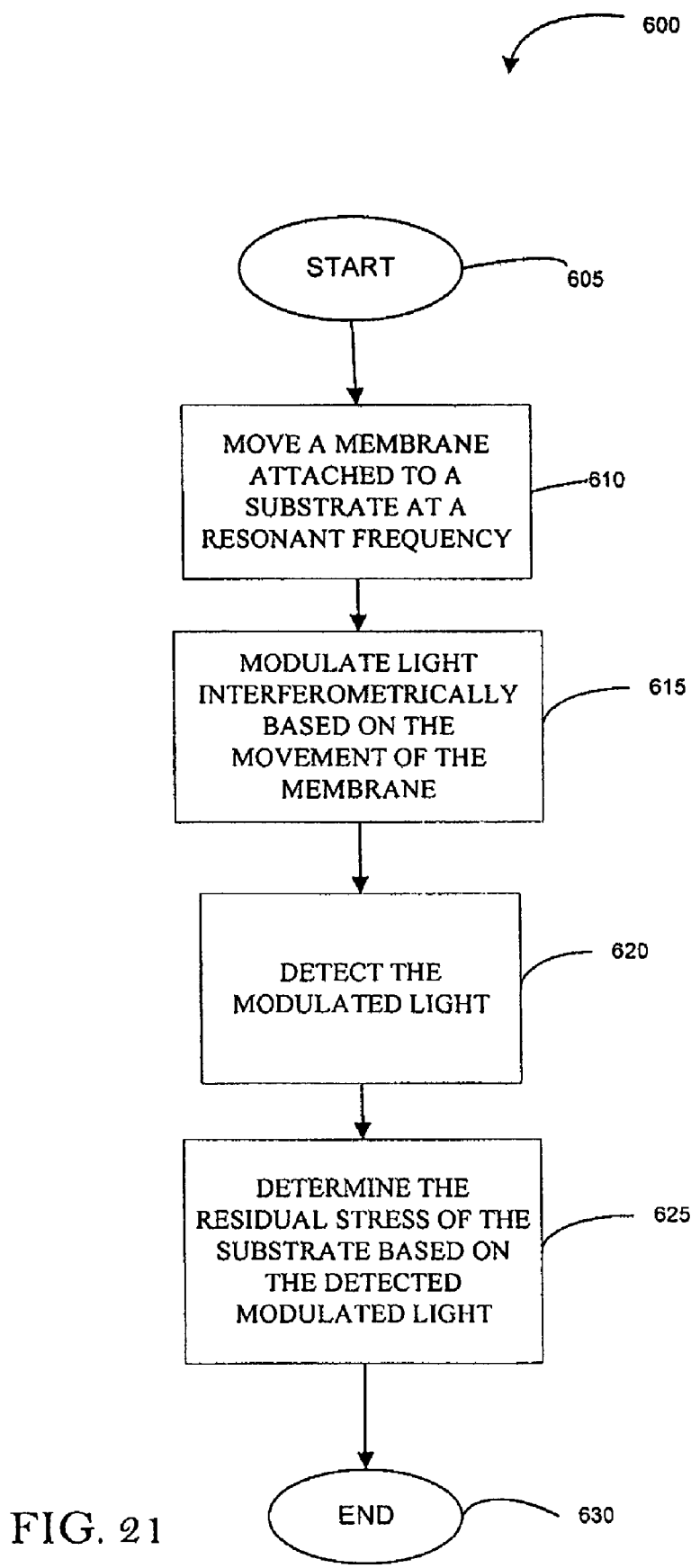
FIG. 21 is a flowchart of another process for determining residual stress of a substrate.

FIG. 21 is a flowchart of another process 600 for determining residual stress in film(s) which are used to form the deformable membrane. Process 600 starts at state 605 and proceeds to state 610 where a membrane is moved at a resonant frequency. In some embodiments, this is performed using the test unit 300 illustrated in FIG. 17. The test unit 300 can be driven by an AC voltage signal (or an AC voltage signal in combination with DC voltage signal) in the stable regime so that the test unit 300 does not actuate (e.g., driving voltages are smaller than the actuation voltages). The frequency of the applied voltage can be scanned over the relevant range of frequencies while maintaining the voltage at a consistent amplitude. The amplitude of vibration of the test unit's deformable membrane will be at a maximum when the resonance frequency is reached during the frequency scan, which is indicated in the optical signal generated in state 615. At state 615, the process 600 modulates light based on the movement of the membrane. The light can be incident ambient light or light specifically directed to the test unit. The light is modulated interferometrically by the movement of the highly reflective membrane 330 through the interferometric cavity 325 at its resonant frequency, which is affected by the present residual stress. The process 600 then proceeds to state 620 where the modulated light is detected, using, e.g., the system shown in FIG. 19. Finally the process 600 proceeds to state 625 where it determines the residual stress of the substrate based on the detected modulated light, and resulting residual stress information can be output to a user using a display or a printout, as desired. The process 600 then ends at state 630.

Figure 22:
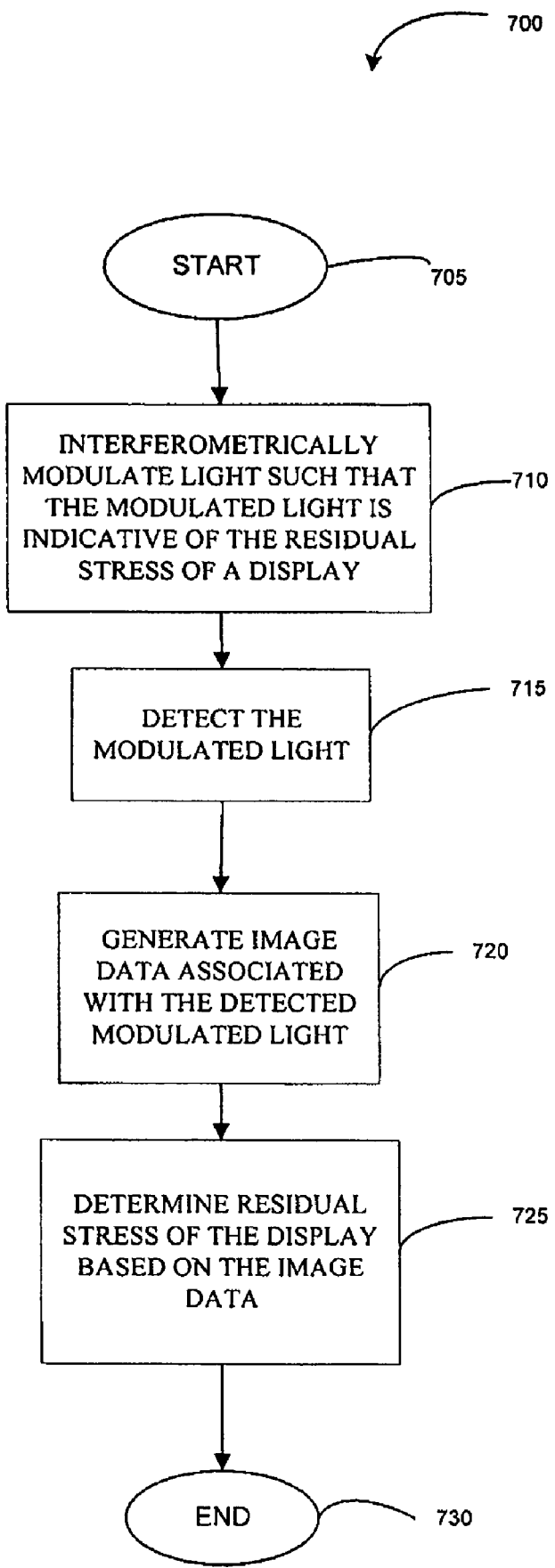
FIG. 22 is a flowchart of another process for determining residual stress of a display.

FIG. 22 is a flowchart of a process 700 for determining residual stress of film(s) in the deformable membranes of a display panel (e.g., panel 410 in FIG. 18) of a display device. Process 700 starts at state 705 and proceeds to state 710 to interferometrically modulate light such that the modulated light is indicative of the residual stress. This can be performed by one or more of the test units shown in FIG. 18, and in some embodiments is done using a plurality of test units placed in locations that surround the display panel such that the stress in membranes located across the display panel can be determined. Process 700 then proceeds to state 715 to detect the modulated light, using, for example, the optical device 450 and the imaging system 455 illustrated in FIG. 19. Process 700 then proceeds to state 720 to generate image data associated with the detected modulated light. In some embodiments, this is also performed by the imaging system 455.

Finally, process 700 proceeds to state 725 to determine the residual stress of the deformable membranes on the display based on the image data. The computer system 460 (FIG. 19) can be used to perform this step. Process 700 then ends at state 730.

In any of the processes specifically described above, one or more steps may be added, or a described step deleted, without departing from at least one of the aspects of the invention. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. The various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

Various modifications to these examples may be readily apparent to those skilled in the art, and the generic principles defined herein may be applied to other examples without departing from the spirit or scope of the novel aspects described herein. Thus, the scope of the disclosure is not intended to be limited to the examples shown herein but is to be accorded the widest scope consistent with the principles and novel features disclosed herein. Accordingly, the novel aspects described herein is to be defined solely by the scope of the following claims.

The invention claimed is:

1. A test unit configured to indicate residual stress in a deposited film, wherein the test unit is configured to interferometrically modulate light indicative of average residual stress in two orthogonal directions of the film.

2. The test unit of claim 1, wherein the test unit comprises:
   a reflective deformable membrane attached to the substrate, the membrane configured as a parallelogram with at least a portion of each side attached to the substrate, and wherein the membrane comprises a portion of the deposited film; and
   an interferometric cavity formed between a portion of the membrane and a portion of the substrate,
   wherein the membrane is configured to deform based on the residual stress of the film and modulate light indicative of the amount of membrane deformation.

3. The test unit of claim 2, wherein the membrane comprises silicon, aluminum, nickel, germanium, gold, chromium, silver, or alloys thereof.

4. The test unit of claim 2, wherein the membrane is configured such that light modulated by the membrane includes color information that indicates the residual stress of the films.

5. The test unit of claim 2, wherein the membrane comprises an etch hole.

6. A system configured to determine residual stress of a deposited film, comprising:
   one or more test units, each test unit comprising a reflective membrane that comprises a portion of the deposited film, wherein the membrane is configured as a parallelogram with at least a portion of each side attached to a substrate, wherein the membrane is configured to deform based on the residual stress of the film and modulate light indicative of the amount of membrane deformation;
   an imaging system positionable to receive modulated light reflecting from the one or more test units and configured to produce image data associated with the received light; and
   a computer in communication with the imaging system, the computer configured to process the image data and generate information relating to the residual stress in the film.

7. The system of claim 6, wherein the computer is configured to calculate deformation information of the membrane based on the image data, and further configured to determine the information relating to the residual stress based on the deformation information.

8. The system of claim 6, wherein the test unit is configured such that the modulated light received by the imaging system includes color information that indicates the deformation of the membrane.

9. The system of claim 6, wherein the each of the one or more test units comprise an interferometric cavity formed between a portion of the membrane and a portion of the substrate, wherein the membrane is configured to deform based on the residual stress of the film and modulate light based on the amount of deformation.

10. The system of claim 6, wherein the imaging system comprises an optical system and a high resolution imaging device.

11. The system of claim 6, wherein at least one of the test devices are configured to be placed in a relaxed state or an actuated state.

12. The system of claim 6, wherein the one or more test units further comprises an interferometric cavity between the membrane and the substrate.

13. The system of claim 6, wherein the one or more test units are configured to indicate average residual stress in two orthogonal directions.

14. A method of measuring residual stress of a deposited film, the method comprising interferometrically modulating light using a membrane that deforms based on residual stress of the film such that the modulated light indicates the residual stress in the film in two orthogonal directions.

15. The method of claim 14, further comprising determining the residual stress of the film based on the modulated light.

16. The method of claim 15, further comprising receiving the modulated light in an imaging system, generating image data associated with the modulated light, and determining the residual stress of the film using the image data.

17. The method of claim 16, further comprising providing the image data to a computer for use in determining the residual stress.

18. The method of claim 17, wherein determining the residual stress comprises:
   determining deformation information of the membrane based on the image data; and
   generating residual stress information based on the deformation information.

19. The method of claim 18, wherein determining deformation information comprises analyzing color information in the image data, the color information being indicative of the deformation of the membrane.

20. A test unit for measuring residual stress in a deposited film, comprising means for reflecting a first portion of light, and means for reflecting a second portion of light that interferes with the first portion of light to modulate light indicative of average residual stress in two orthogonal directions of the film.

21. The test unit of claim 20, further comprising means for determining the residual stress of the film based on the modulated light.

22. The test unit of claim 21, wherein the determining means comprises means for receiving the modulated light, means for generating image data from the received modulated light, and means for determining residual stress information based on the image data.

23. The test unit of claim 20, wherein the first portion of light reflecting means comprises a partially-reflective surface of the substrate, and the second portion of light reflecting means comprises a reflective membrane attached to the substrate, the membrane configured as a parallelogram with at least a portion of each side connected to the substrate, the membrane further configured to deform based on the residual stress of the film, wherein the modulated light is indicative of the amount of membrane deformation.

24. The device of claim 22, wherein the light receiving means comprises an optical system.

25. The device of claim 22, wherein the image data generating means comprises a high resolution imaging device.

26. The device of claim 22, wherein the residual stress determining means comprises a computer in communication with the image data generating means, the computer configured to process the image data and generate residual stress information of the film.

27. A method of manufacturing a device to indicate the residual stress in a deposited film, the method comprising disposing a thin reflective membrane on a substrate such that an interferometric cavity is formed between a portion of the membrane and a portion of the substrate, wherein the membrane comprises a portion of the deposited film, and wherein the membrane is configured in the shape of a parallelogram with at least a portion of each side attached to the substrate, and the membrane is further configured to deform based on the residual stress of the film in two orthogonal directions and modulate light indicative of the amount of deformation.

28. A display device, comprising:
   a substrate;
   one or more one bi-stable display elements disposed on the substrate wherein each the one or more bi-stable display elements comprise a moveable membrane which comprises a portion of a film; and
   one or more test units, each test unit comprising a membrane defining a portion of an interferometric cavity, wherein the membrane comprises a portion of the film having at least three perimeter edges, at least a portion of each of the three perimeter edges being attached to the substrate, wherein the one or more test units are configured to modulate light such that the modulated light is indicative of the residual stress of the film.

29. The display device of claim 28, wherein the one or more test units are configured to modulate light such that the modulated light is indicative of the residual stress of the film in one direction.

30. The display device of claim 28, wherein the one or more test units are configured to modulate light such that the modulated light is indicative of the average residual stress of the film in two orthogonal directions.

31. The display device of claim 28, wherein four test units are disposed on the substrate near the display in a configuration that surrounds the display.

32. The display device of claim 28, wherein one or more test units are disposed throughout the display.

33. The display device of claim 28, wherein at least a portion of the display is configured as a parallelogram having four corners, and a test unit is disposed near each of the four corners of the display to indicate residual stress of the film across the display.

34. The display device of claim 33, wherein the test units are configured to modulate light such that the modulated light is indicative of the residual stress of the film in two orthogonal directions.

35. The display device of claim 28, wherein the perimeter of the membrane is configured as a parallelogram, and at least a portion of each side of the membrane is connected to the substrate to form the interferometric cavity between the membrane and the substrate.

36. The display device of claim 28, wherein the membrane is configured such that the perimeter of the membrane is connected to the substrate to form the interferometric cavity between the membrane and the substrate.

37. A method of determining residual stress of a film layer incorporated in a display, comprising:
   interferometrically modulating light, wherein the modulated light is indicative of the residual stress in the film layer in two orthogonal directions;

detecting the modulated light;

generating image data associated with the detected modulated light; and determining residual stress of the film layer of the display based on the image data.

38. The method of claim 37, wherein interferometrically modulating light comprises deforming a membrane of a test unit based on the residual stress of the film layer, the deformity of the membrane affecting the light modulation.

39. The method of claim 38, wherein the image data comprises color information, and wherein determining the residual stress comprises associating the color information in the image data with predetermined deformation characteristics of the test unit to determine residual stress of the film layer of the display.

* * * * *

UNITED STATES PATENT AND TRADEMARK OFFICE
CERTIFICATE OF CORRECTION

PATENT NO. : 7,636,151 B2  Page 1 of 1
APPLICATION NO. : 11/453633
DATED : December 22, 2009
INVENTOR(S) : Manish Kothari, Lior Kogut and Clarence Chui It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 530 days.

Title page, item (57), in the Abstract, line 13, please delete "of in" and insert therefore, --of--.

At page 4, line 42 of the second column, please delete "Perfomorance" and insert therefore, --Performance--.

At page 4, line 60 of the second column, please delete "retreived" and insert therefore, --retrieved--.

At page 5, line 14 of the second column, please delete "Microelectricalmechanical" and insert therefore, --Microelectromechanical--.

At sheet 12 of 22, in the X-axis labels of FIG. 12, please delete "10" and insert therefore, --100--.

At sheet 12 of 22, in the X-axis labels of FIG. 12, please delete "35" and insert therefore, --350--.

At sheet 12 of 22, in the X-axis labels of FIG. 12, please delete "40" and insert therefore, --400--.

At column 1, line 21, please delete "and or" and insert therefore, --and/or--.

At column 16, line 58, please delete "thereof" and insert therefore, --thereof)--.

At column 18, line 7, please delete "the a" and insert therefore, --a--.

At column 19, line 59, please delete "the a" and insert therefore, --a--.

Signed and Sealed this

Seventeenth Day of August, 2010

David J. Kappos
*Director of the United States Patent and Trademark Office*